United States Patent
Acharya et al.

(10) Patent No.: US 7,676,823 B2
(45) Date of Patent: Mar. 9, 2010

(54) USER INTERFACE METHODS AND APPARATUS FOR ROAMING ACCESS TO SUBSCRIPTION SERVICES

(75) Inventors: Swarup Acharya, New Providence, NJ (US); Yuh-Jye Chang, Bridgewater, NJ (US); Anurag Srivastava, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 694 days.

(21) Appl. No.: 11/425,566

(22) Filed: Jun. 21, 2006

(65) Prior Publication Data

US 2007/0300252 A1  Dec. 27, 2007

(51) Int. Cl.
*G06F 3/00* (2006.01)
*G06F 13/00* (2006.01)
*H04N 5/445* (2006.01)

(52) U.S. Cl. .............................. 725/37; 725/59; 725/46; 725/51; 725/47

(58) Field of Classification Search .................. 725/86, 725/87, 60, 61, 62, 109, 110, 131, 139, 151, 725/100
See application file for complete search history.

(56) References Cited

U.S. PATENT DOCUMENTS

| | | | |
|---|---|---|---|
| RE34,895 E | | 4/1995 | Morotomi et al. |
| 5,774,825 A | * | 6/1998 | Reynolds ..................... 725/131 |
| 6,163,272 A | * | 12/2000 | Goode et al. .................. 725/30 |
| 6,754,904 B1 | * | 6/2004 | Cooper et al. ................. 725/32 |
| 7,103,428 B2 | * | 9/2006 | Varone et al. ............... 715/736 |
| 2002/0178446 A1 | * | 11/2002 | Sie et al. ........................ 725/32 |
| 2002/0184652 A1 | * | 12/2002 | Cezeaux ...................... 725/132 |
| 2003/0030751 A1 | | 2/2003 | Lupulescu et al. |

(Continued)

FOREIGN PATENT DOCUMENTS

WO   WO2006020968   2/2006

(Continued)

OTHER PUBLICATIONS

U.S. Appl. No. 11/399,872, filed Apr. 7, 2006, Acharya et al., "Delivery of Subscription Services to Roaming Users Through Head End Equipment."

(Continued)

*Primary Examiner*—Brian T Pendleton
*Assistant Examiner*—Fernando Alcon
(74) *Attorney, Agent, or Firm*—Ryan, Mason & Lewis, LLP

(57) ABSTRACT

A subscriber or other user is provided with access to a subscription service of a signal distribution system at a roaming location remote from a home location of the user. The subscription service comprises a plurality of selectable channels available to the user at the home location. In one aspect of the invention, a request for initiation of a roaming session is received, and responsive to initiation of the roaming session, at least one user interface is generated for presentation on a device at the remote location. The generated user interface is configured to provide access at the remote location to one or more of the channels available to the user at the home location, and represents an at least partial alteration of a normal user interface that would otherwise be presented on the device at the remote location in the absence of the roaming session.

19 Claims, 23 Drawing Sheets

U.S. PATENT DOCUMENTS

| | | |
|---|---|---|
| 2003/0126595 A1* | 7/2003 | Sie et al. .................... 725/29 |
| 2004/0116118 A1 | 6/2004 | Karaoguz et al. |
| 2004/0128693 A1 | 7/2004 | Weigand |
| 2004/0163127 A1* | 8/2004 | Karaoguz et al. ........... 725/120 |
| 2004/0221305 A1* | 11/2004 | Broussard et al. ............. 725/38 |
| 2004/0233281 A1 | 11/2004 | Tolmei |
| 2004/0235492 A1 | 11/2004 | Chang et al. |
| 2004/0259522 A1 | 12/2004 | Alicherry et al. |
| 2005/0028208 A1* | 2/2005 | Ellis et al. .................... 725/58 |
| 2006/0048184 A1* | 3/2006 | Poslinski et al. ............. 725/45 |
| 2006/0095471 A1 | 5/2006 | Krikorian et al. |

FOREIGN PATENT DOCUMENTS

WO  PCTUS2007014333   11/2008

OTHER PUBLICATIONS

U.S. Appl. No. 11/399,726, filed Apr. 7, 2006, Anurag Srivastava, "Method and Apparatus for Delivering Subscription Service Content to Roaming Users."

U.S. Appl. No. 11/145,832, filed Jun. 6, 2005, Acharya et al., "Signal Distribution System with User-Defined Channel Comprising Information from an External Network."

U.S. Appl. No. 11/130,329, filed May 16, 2005, Acharya et al., "Method and Apparatus for Providing Remote Access to Subscription Television Services."

Sling Media, "Slingbox User Guide," http://support.slingmedia.com, 2005, 112 pages.

B. Howard, "Slingbox," PC Magazine, http://www.pcmag.com, Jun. 30, 2005, 2 pages.

\* cited by examiner

USER INTERFACE METHODS AND APPARATUS FOR ROAMING ACCESS TO SUBSCRIPTION SERVICES

RELATED APPLICATION(S)

The present application is related to U.S. patent application Ser. No. 11/130,329, filed May 16, 2005 and entitled "Method and Apparatus for Providing Remote Access to Subscription Television Services," U.S. patent application Ser. No. 11/145,832, filed Jun. 6, 2005 and entitled "Signal Distribution System with User-Defined Channel Comprising Information from an External Network," U.S. patent application Ser. No. 11/399,726, filed Apr. 7, 2006 and entitled "Method And Apparatus for Delivering Subscription Service Content to Roaming Users," and U.S. patent application Ser. No. 11/399,872, filed Apr. 7, 2006 and entitled "Delivery of Subscription Services to Roaming Users Through Head End Equipment," all commonly assigned herewith and incorporated by reference herein.

FIELD OF THE INVENTION

The present invention relates generally to signal distribution systems, and more particularly to techniques for distributing content associated with subscription services to roaming users in signal distribution systems.

BACKGROUND OF THE INVENTION

Conventional signal distribution systems include, by way of example, cable television systems, satellite television systems, and systems providing Internet protocol television (IPTV) over digital subscriber line (DSL) or fiber. Such systems are configured to distribute media streams associated with subscription television services to system subscribers or other users. Subscription television services are usually tied to a particular household or other predetermined subscriber location. Typically, a given subscriber is provided with an interface device, such as a set-top box or receiver, for communicating with system head end equipment. The interface device is configured to permit the subscriber to receive, on a television or other presentation device coupled to the interface device at a home location, the particular subscription television services to which that subscriber is entitled by virtue of the subscription. A given subscription may encompass, by way of example, a number of basic broadcast channels, as well as one or more premium programming channels, such as movie channels, sports channels, specialty channels, pay-per-view channels, on-demand video channels, etc.

A serious drawback of conventional cable, satellite and IPTV systems is that there is typically no roaming capability provided for subscribers. That is, subscribers generally must be at their respective home locations in order to receive the television services to which they have subscribed. By way of example, if a first subscriber leaves his or her home location and visits a remote location that also serves as a home location for a second subscriber, there is no mechanism provided for allowing the first subscriber to access his or her subscription television services at the second subscriber location. Thus, if the first subscriber has paid for access to a premium programming channel at his or her home location, that subscriber has no ability to access the premium programming channel at the remote location. This is the case even if the remote location, that is, the home location of the second subscriber, has the same television service provider and type of interface device as the home location of the first subscriber.

The above-cited U.S. patent application Ser. No. 11/130,329 discloses techniques which address and solve the remote accessibility problem. In one embodiment disclosed therein, an arrangement is provided whereby subscribers can access their usual home location subscription television services when at remote locations, without the need for carrying media devices, communications devices or other equipment to the remote locations.

Further advances in remote accessibility are described in the above-cited U.S. patent application Ser. Nos. 11/145,832, 11/399,726 and Ser. No. 11/399,872.

Despite the considerable advances provided by the techniques described in the above-cited U.S. patent applications, a need remains for additional improvements in providing user accessibility to subscription television services or other content via cable, satellite and IPTV systems, as well as other types of signal distribution systems.

SUMMARY OF THE INVENTION

The present invention in the illustrative embodiments provides techniques for generating remote location electronic program guides or other user interfaces which facilitate the delivery of subscription television services or other content to roaming subscribers.

In accordance with one aspect of the invention, a subscriber or other user is provided with access to a subscription service of a signal distribution system at a roaming location remote from a home location of the user. The subscription service comprises a plurality of selectable channels available to the user at the home location. A request for initiation of a roaming session is received, for example, in an interface device or head end equipment of the system, and may be processed in a manner that results in initiation of the roaming session. Responsive to initiation of the roaming session, at least one user interface is generated for presentation on a device at the remote location. The device utilized to present the generated user interface may be a television or other type of presentation device, and may be integrated with or separate from an interface device. The generated user interface is configured to provide access at the remote location to one or more of the channels available to the user at the home location, and represents an at least partial alteration of a normal user interface that would otherwise be presented on the device at the remote location in the absence of the roaming session. For example, the generated user interface may partially or completely replace the normal user interface. As a more particular example, the normal user interface may indicate that a given one of the channels available to the user at the home location is unavailable at the remote location, and the generated user interface may indicate that the given channel is available at the remote location in conjunction with the roaming session.

The normal user interface may comprise an activatable icon or other control for initiating the roaming session. The roaming session may be initiated by the user entering an account number and access code or other type of authentication information via a login screen of the normal user interface. Such a screen may be configured to permit the user to specify a duration for the roaming session.

In another aspect of the invention, the normal user interface comprises a plurality of identifiers of contiguous channels which are allocated for presentation of roaming content, and the generated user interface replaces said identifiers with respective identifiers of at least a subset of the plurality of channels available to the user at the home location.

The generated user interface may also be configured to provide an automatic warning message prior to expiration of the roaming session. The generated user interface may further comprise an activatable icon or other control that allows the roaming session to be renewed prior to its expiration.

In a further aspect of the invention, at least one user interface is generated for presentation on a device at the home location. This home location user interface includes information regarding the roaming session. For example, the home location user interface may comprise an activatable icon or other control which if activated will terminate the roaming session initiated at the remote location, or prevent the initiation of a proposed roaming session. As another example, the home location user interface may comprise an activatable icon or other control which if activated provides information identifying at least the status of the initiated roaming session and an indication as to the corresponding remote location at which the session was initiated.

The illustrative embodiments advantageously facilitate the provision of subscription television services or other content to roaming subscribers, by providing electronic program guides or other user interfaces that present available roaming content in an efficient and flexible manner. Also, theft of roaming services is deterred by providing, for example, an ability to specify roaming session duration, and an option for home location termination of roaming sessions established at remote locations.

BRIEF DESCRIPTION OF THE DRAWINGS

FIGS. 3 through 23 show examples of user interface screens that may be presented to users via televisions or other presentation devices of the system of FIG. 1A.

DETAILED DESCRIPTION OF THE INVENTION

The invention will be illustrated herein in conjunction with illustrative embodiments of signal distribution systems and associated content delivery techniques. It should be understood, however, that the invention is not limited to use with the particular systems and techniques described, but is instead more generally applicable to any signal distribution application in which it is desirable to provide improved roaming capabilities to system users. For example, although described herein primarily in the context of subscription television services, the techniques of the invention can also be adapted in a straightforward manner to subscription audio services, such as those delivered via digital satellite radio systems. Systems of the latter type are considered a type of signal distribution system as that term is used herein.

Figure 1A:
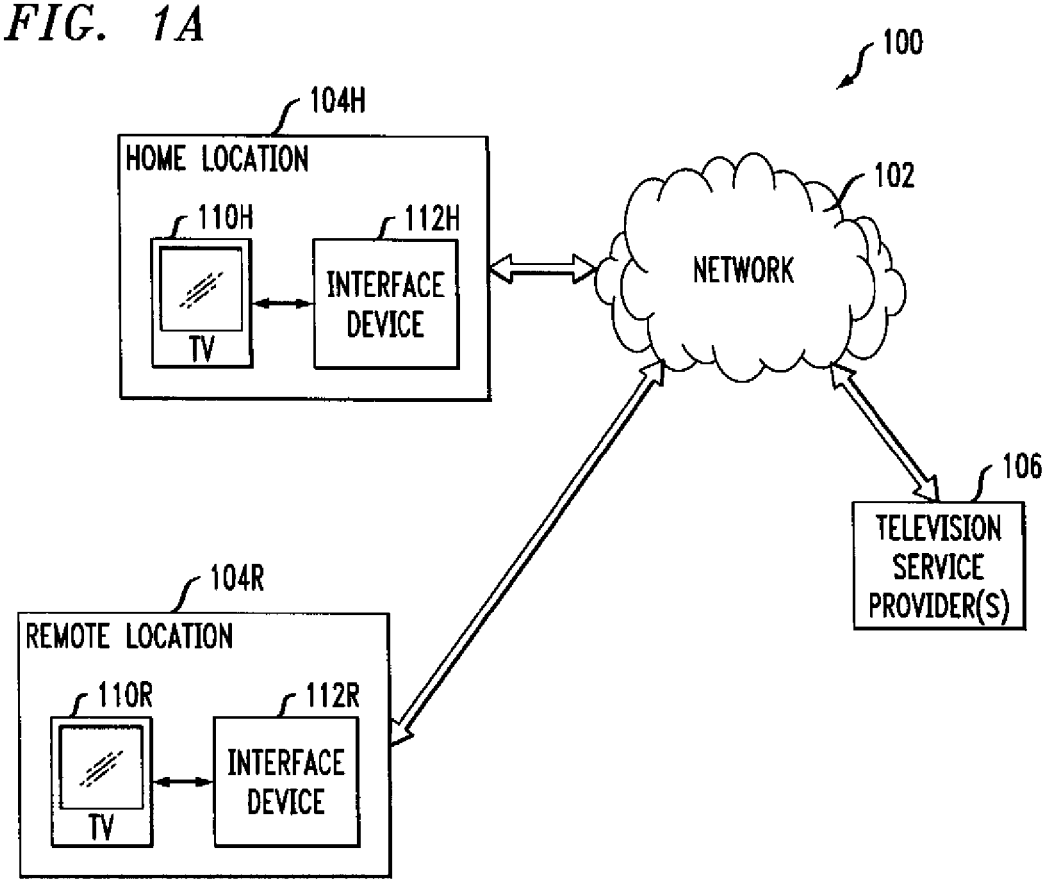
FIG. 1A shows an illustrative embodiment of a signal distribution system in accordance with the invention.

Referring now to FIG. 1A, a signal distribution system 100 comprises a network 102 over which equipment at a home location 104H and a remote location 104R communicates with one or more television service providers 106. The signal distribution system 100 may comprise, by way of example, a cable television system, a satellite television system, an IPTV system, or portions or combinations of these and other systems. Element 106 may comprise otherwise conventional service provider equipment, including, for example, head end systems, satellites, servers, etc. The equipment at the home location 104H comprises a television 110H coupled to an interface device 112H. Similarly, the equipment at the remote location 104R comprises a television 110R coupled to an interface device 112R. The interface devices 112 may comprise, for example, set-top boxes, receivers, computers, or other processor-based devices, in any combination.

The network 102 may comprise any type of communication network suitable for transporting signals associated with the provision of subscriber television services, and the invention is not limited in this regard. For example, portions of the network 102 may comprise local networks, wide area networks, the Internet, etc.

The home location 104H is a designated home location of a particular system subscriber. Thus, it is a location at which the subscriber is permitted to access one or more television services by virtue of his or her subscription. It should be noted that the term "subscriber" as used herein is intended to encompass other subscribing entities, such as businesses or organizations, in addition to individuals or families. Subscribers may be viewed as examples of what are more generally referred to herein as users, and the term "user" is thus intended to include subscribers as well as other types of users. Also, the term "home" should be construed broadly, and is not intended to be restricted to individual or family residences. Instead, the home location of a particular subscriber may be any location at which that subscriber ordinarily accesses television services in accordance with the subscription. A home location may therefore be at a business facility, hotel or other building, in a means of conveyance such as an automobile, train, bus or airplane, or at any other suitable location.

A home location for a given subscriber may serve as a remote location for another subscriber or subscribers. The remote location 104R therefore may be a home location for another system subscriber. Accordingly, remote location 104R, like home location 104H, is also equipped with a television and an interface device as shown. In other embodiments, the remote location need not be a home location for any particular subscriber. For example, the remote location may be a room or other area in a hotel or means of conveyance that is intended to serve multiple subscribers over a given period of time.

It is to be appreciated that the invention does not require any particular geographic relationship between the home location 104H and the remote location 104R. Accordingly, the two locations may be within the same local area, served by a common service provider. As another example, the two locations may be more geographically remote from one another, such as in different regions of the same country, or even in different countries, with the two locations being serviced by different television service providers. It is also possible that the home and remote locations may be in a common building or other structure, for example, in respective first and second apartments of an apartment building. Numerous alternative arrangements are possible, as will be apparent to those skilled in the art.

Figure 1B:
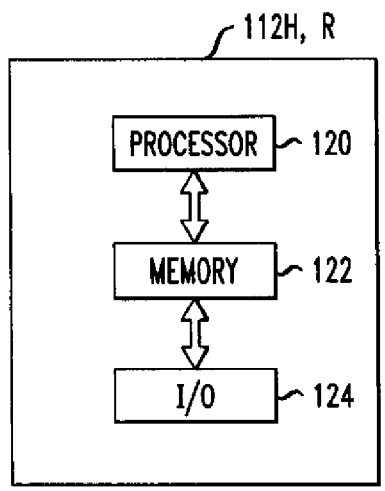
FIG. 1B shows a simplified block diagram of an interface device of the FIG. 1A system.

FIG. 1B illustrates that a given one of the interface devices 112H, 112R comprises a processor 120, a memory 122, and input/output (I/O) elements 124. The processor 120 may be, e.g., a microprocessor, a microcontroller, an application-specific integrated circuit (ASIC) or other type of processing device, as well as portions or combinations of such devices. The memory 122 may include an electronic random access memory (RAM), a read-only memory (ROM) or other type of storage device, as well as portions or combinations of such devices. The processor 120 and memory 122 are used in storage and execution of one or more software programs for implementing roaming television services techniques of a type to be described in greater detail below.

The particular signal distribution system configuration described above should be viewed as an illustrative example of a roaming television service arrangement in accordance with the invention, and it is to be understood that the invention can be implemented using other types and configurations of system components.

Additional details regarding the provision of roaming television services in a system such as that shown in FIG. 1A can be found in the above-cited U.S. patent application Ser. Nos. 11/130,329, 11/145,832, 11/399,726 and Ser. No. 11/399,872.

The present invention in an illustrative embodiment deals with delivery of roaming television services via an IPTV system. It is to be appreciated that the described techniques can be extended in a straightforward manner to be implemented using other types of systems, such as cable or satellite television systems.

Generally, a roaming television services technique in this embodiment allows a subscriber to access his or her subscription television services when away from his or her designated home location. The roaming television services may be provided to a roaming user equipped with any type of interface device. Although the remote location interface device 112R in the FIG. 1A example is illustratively a set-top box, in other embodiments it may be a different type of interface device. Also, television 110R may be replaced with another type of presentation device, such as a computer, mobile telephone, personal digital assistant (PDA), wireless email device or any other type of device capable of presenting output associated with a roaming television service. It is also possible that the interface device and presentation device may be combined into a single device, as in an embodiment in which the interface device comprises a network interface of a computer, mobile telephone or other presentation device.

As noted previously, in other embodiments of the invention the roaming techniques may be applied to non-television services, such as subscription audio services delivered via digital satellite radio or other arrangements.

Figure 2:
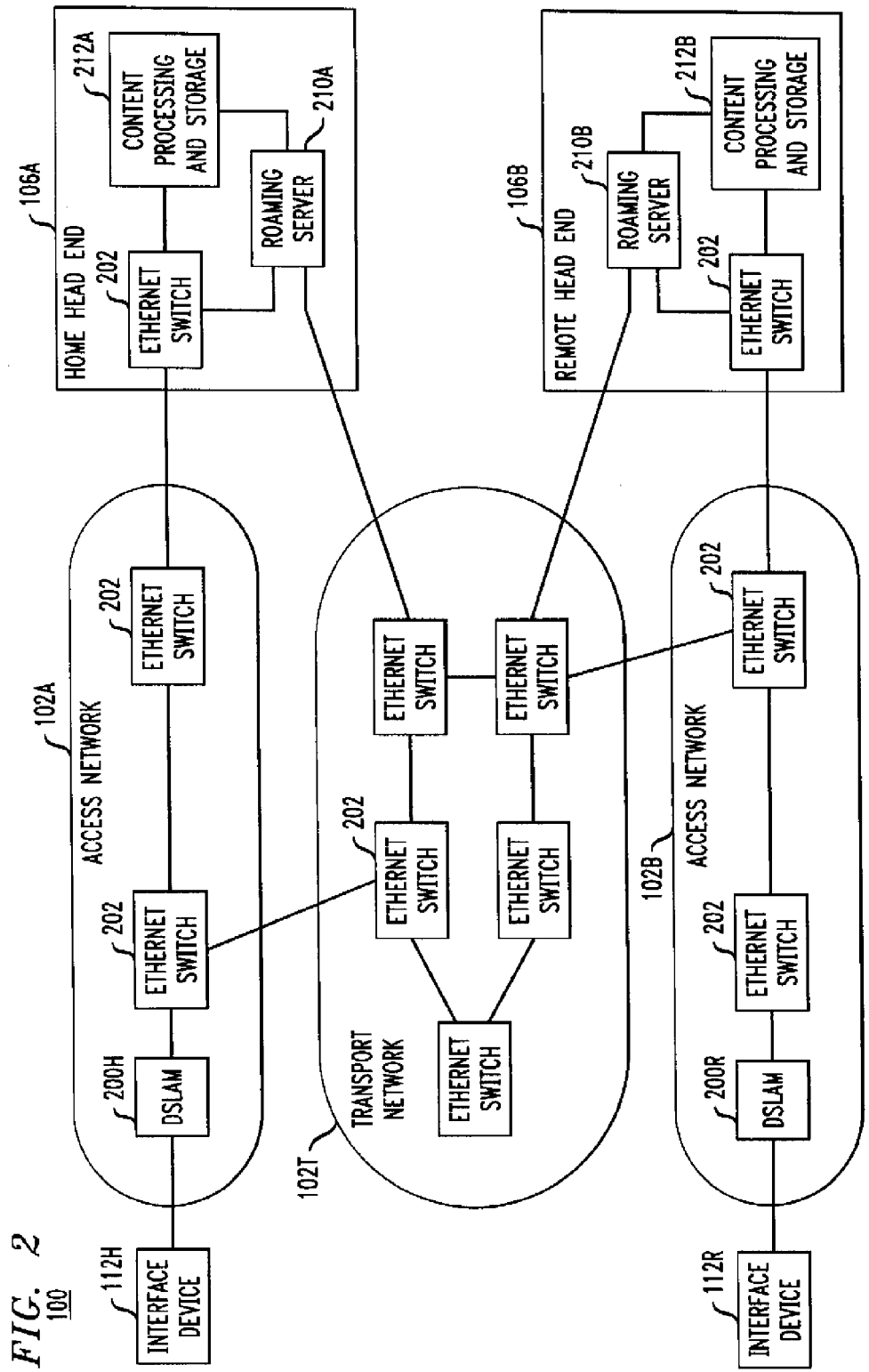
FIG. 2 is a more detailed view of one possible implementation of the FIG. 1A system for delivering roaming television services to a roaming user at a remote location.

FIG. 2 shows a more detailed view of one possible implementation of the system 100 for providing roaming television services via IPTV network head end equipment. The services are implemented at least in part in the form of software that is executed by system elements such as one or more interface devices and equipment of one or more television service providers. Although illustrated in the context of IPTV, the described services can be adapted in a straightforward manner for use in other types of signal distribution systems, such as cable and satellite television systems.

In the system 100 as shown in FIG. 2, home location and remote location interface devices 112H and 112R are coupled to respective digital subscriber line access multiplexers (DSLAMs) 200H and 200R in respective access networks 102A and 102B of network 102. The network 102 in this example further includes a transport network 102T. The access networks 102A and 102B and the transport network 102T each include multiple Ethernet switches 202, although other types of switches or routing elements may be used, in any combination. The particular interconnections among the switches 202 and their placement in particular networks or other elements of the system 100 is purely by way of illustrative example, and a wide variety of alternative arrangements may be used.

Also shown in the system are a home head end 106A and a remote head end 106B, both considered part of the television service provider(s) 106 of FIG. 1A. Each of these head ends comprises head end equipment including a roaming server 210 and a content processing and storage element 212. The head end equipment also includes an Ethernet switch 202 coupled to the corresponding access network. It is to be appreciated that the particular type of head end equipment as shown in FIG. 2 is merely an example, and may be altered in other embodiments. For example, the Ethernet switches in the head end equipment may be replaced with other types of switches or routing elements. Also, the roaming server may be combined with the content processing and storage element, or may be separated into other arrangements of elements providing similar functionality as described herein.

The servers 210A and 210B are referred to herein as "roaming" servers in that they are utilized in obtaining content for one or more roaming subscribers in system 100 and making that content available to the roaming subscribers. For example, as will be described in greater detail below, the roaming server 210B at the remote head end 106B may obtain content from the roaming server 210A at the home head end 106A in order to make such content available to a roaming user via remote location interface device 112R. The content processing and storage elements 212 may comprise otherwise conventional head end equipment for delivery of content to subscribers via the access networks 102A and 102B, such as controllers, signal combiners, databases or other storage devices, middleware, IPTV servers, local television acquisition servers, or other typical head end elements, in any combination.

A given subscriber may be viewed as having an associated home location channel lineup, representing the particular broadcast or premium programming channels, network personal video recorder (NPVR) channels, video-on-demand (VoD) channels, user-defined channels, or other types of channels that are available to the subscriber at his or her home location in accordance with a subscription service.

An issue that arises when a subscriber wishes to view his or her home location channel lineup at a remote location served by a different bead end relates to the manner in which identifiers of the available roaming channel(s) are presented via an electronic program guide (EPG) or other user interface at the remote location. By way of example, assume that a roaming subscriber from New York visits Chicago, and is interested in watching his home location news broadcast, such as WNBC New York Channel 4. Unfortunately, a given available EPG in Chicago will likely have a different local television station associated with that channel, as Chicago is in an entirely different broadcast area, also referred to as a designated market area (DMA), than New York. Thus, there is a need to alter the EPG or other user interface that is presented to a roaming user in order to facilitate access to available roaming content.

The illustrative embodiments to be described below provide particularly efficient techniques for configuring user interfaces to accommodate roaming users. Examples of such user interfaces as presented on a given television or other presentation device at a home or remote location are shown in FIGS. 3 through 23. These techniques will be described in the context of EPGs, but it is to be appreciated that a wide variety of other types of user interfaces may be used.

In the exemplary user interface techniques to be described below, it is assumed that a subscriber has a "roaming profile" comprising a number of channels of the subscription service that are designated as being available to that subscriber at remote locations. The roaming profile may comprise all of the channels that are part of the above-noted home location channel lineup of the subscriber, or just selected ones of those channels. For example, the subscriber may be permitted to designate certain ones of the channels of the home location lineup for remote location access, via commands that are provided to the system using the home location interface device 112H.

A given subscriber may create multiple roaming profiles, for example, comprising different roaming profiles for different family members. Such an arrangement may be used to preserve the functionality of parental control for channels unsuitable for children. Each of the roaming profiles may have a different personal identifier number (PIN) or other access code associated therewith.

Figure 20:
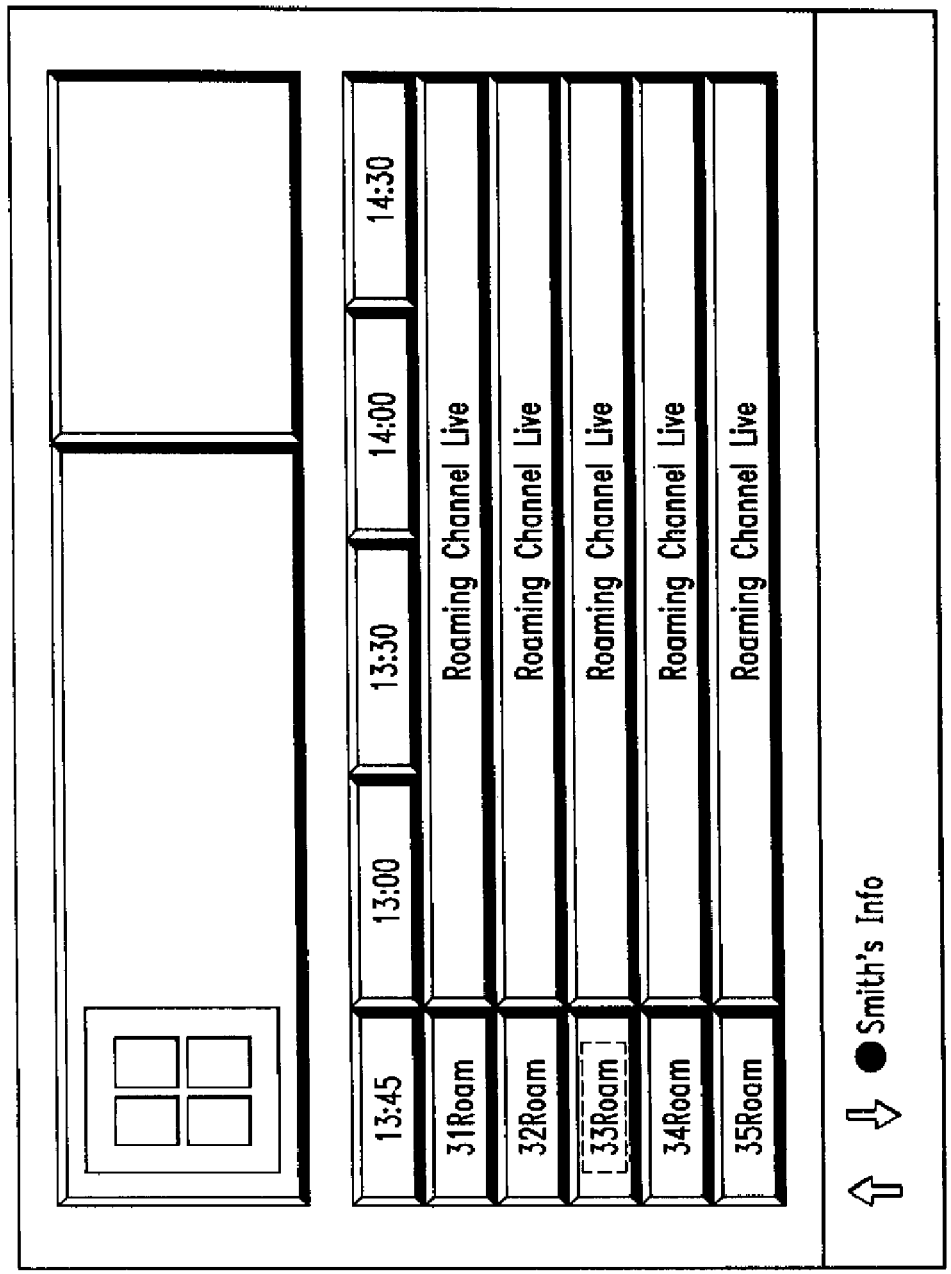

In one of the illustrative embodiments, a group of possibly contiguous, otherwise unallocated, channels at the remote location is specifically reserved for roaming subscribers. For example, channels 500-510 in a given system, or any other arrangement of contiguous or non-contiguous channels, may be designated as roaming channels for that system. When no roaming is taking place, each of these reserved roaming channels may simply display a fixed page indicating that roaming is not enabled and no roaming content is available. The EPG for these channels will display identifying information for each roaming channel, such as the channel number and name, e.g., "Roaming Channel Live." An example of such an EPG is shown in FIG. 20.

Figure 21:
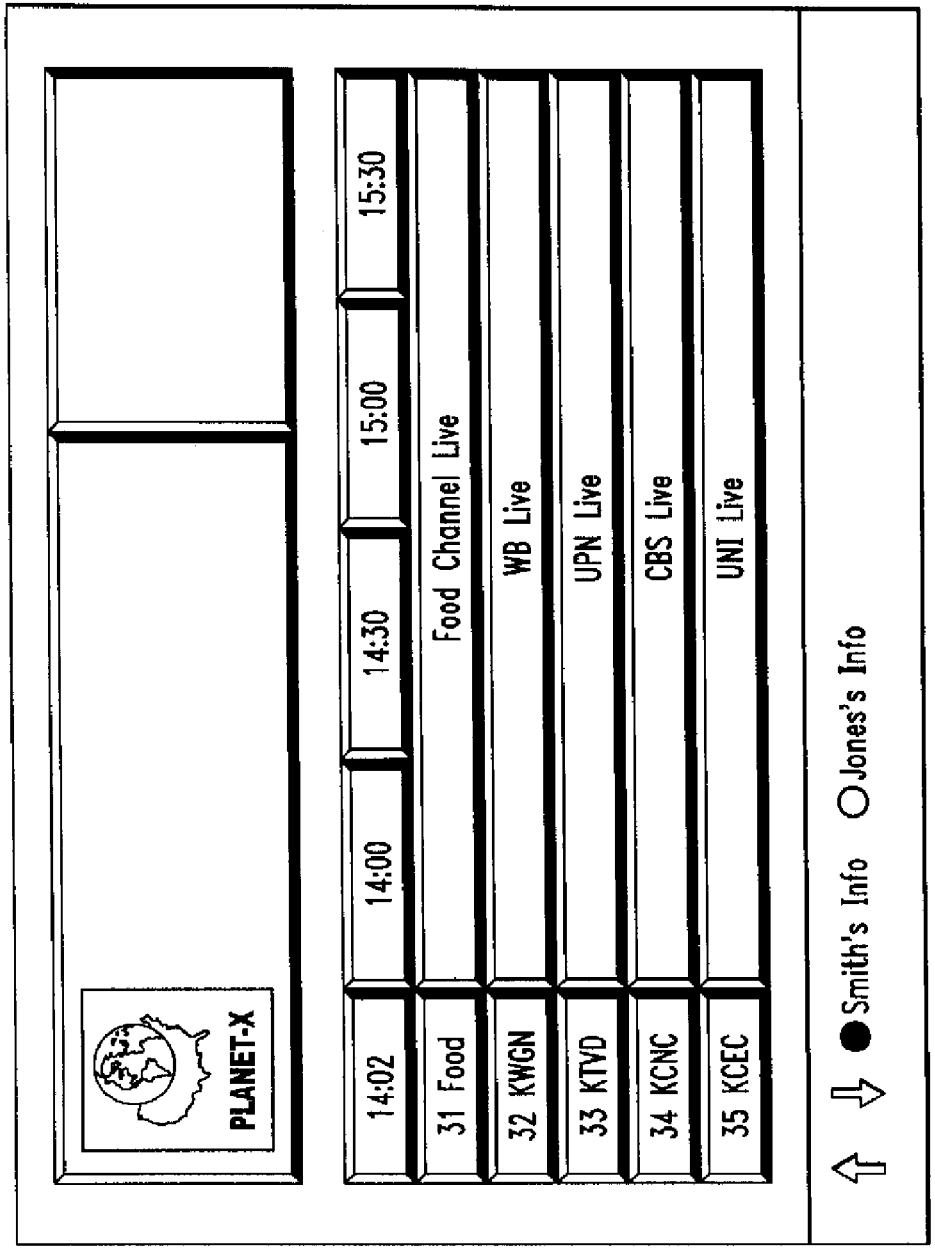
Figure 22:
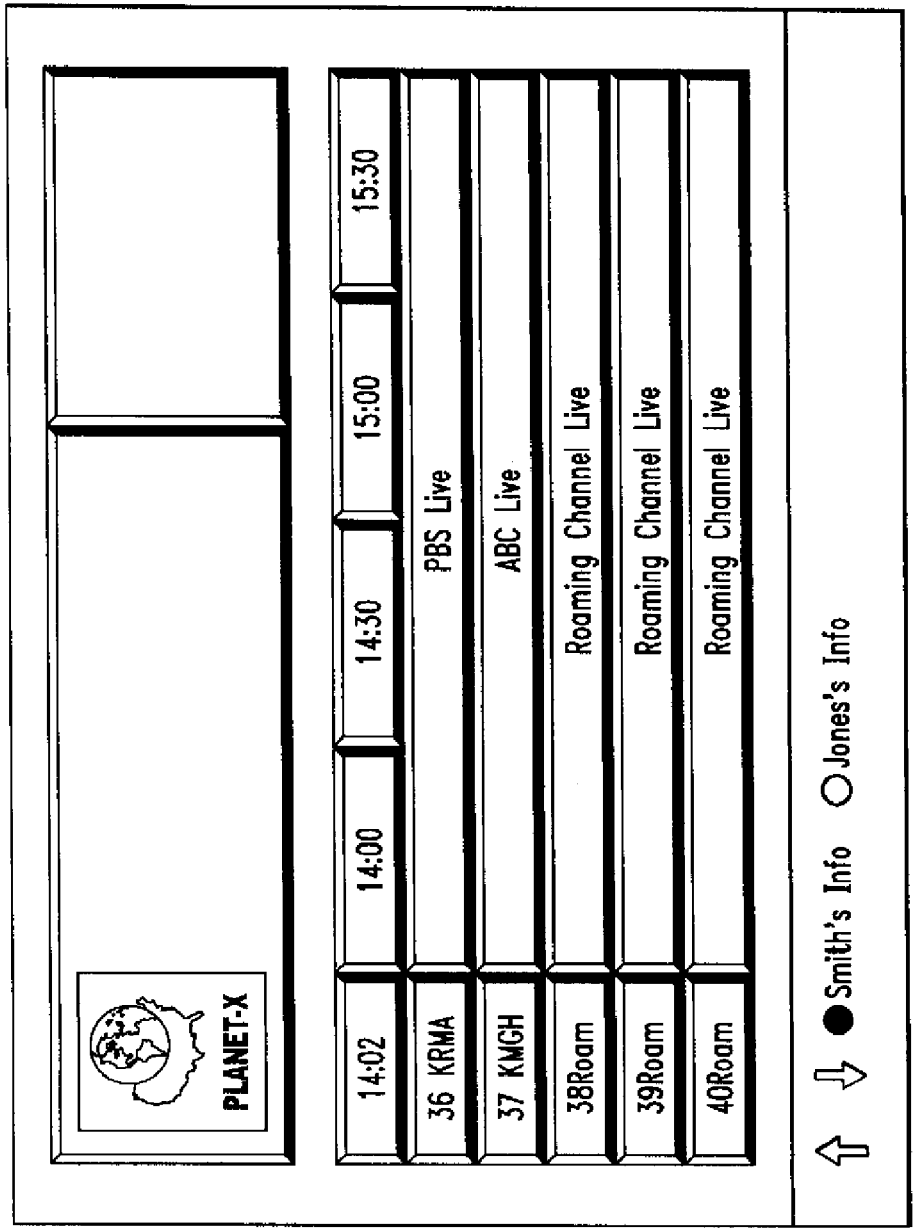
Figure 23:
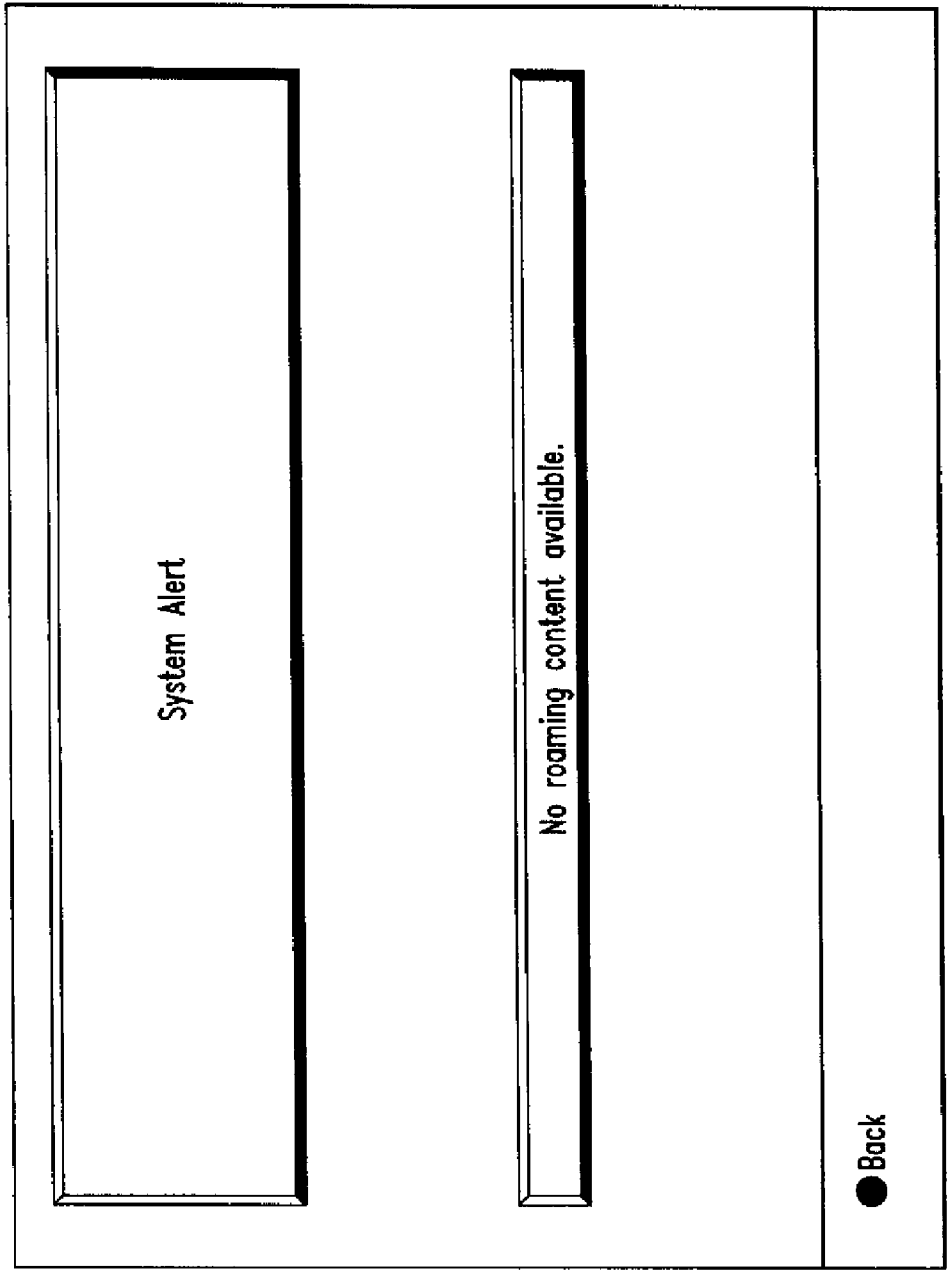

After roaming has been initiated at the remote location by a given subscriber, the roaming channels of the EPG at that location will carry respective identifiers of channels from the roaming profile of the given subscriber. If the subscriber has fewer roaming channels in his or her roaming profile than the total number of roaming channels that are available at the remote location, some of the available channels will remain empty and will not carry any content. The EPG for the roaming channels will be updated with the identifiers of the available home location content from the roaming profile. An example of an EPG updated in this manner is shown in FIGS. 21 and 22.

The EPG at the remote location may be continuously updated while roaming is in effect so as to reflect the latest information regarding the available roaming content. Accessing a given channel of the EPG will result in display of the corresponding home location content at the remote location.

If there are insufficient channels available at the remote location to accommodate all of the home location channels in the roaming profile of a given subscriber, at least a subset of the channels of the roaming profile could be made accessible on demand via appropriate configuration of the EPG. For example, the EPG could be configured to present identifying information for any such roaming channels, without specifically allocating a remote location channel for delivery of the corresponding content. Such an arrangement still allows the user to select a particular roaming channel via the EPG, but not by cycling through a set of contiguous assigned roaming channels.

It should be noted that a subscriber roaming to a remote location served by the same head end as the home location of that subscriber may already have all of his or her home location channels available via the usual remote location EPG. In such a circumstance, identifying information for the roaming channels may be provided in a manner consistent with conventional operation of the remote location EPG.

At the remote location, a roaming subscriber authenticates himself or herself to the system using appropriate authentication techniques. For example, an identifier of the roaming user profile and associated PIN or other access code may be entered. The identifier may be a telephone number, account number, or other information in any combination. Such information may be entered via a roaming user authentication screen of the EPG.

Other information that may be presented via the authentication screen or other similar user interface screen of the EPG may include, for example, information which identifies a period of time for which the subscriber would like the roaming to be in effect, that is, how long the authenticated roaming session will last. Such information is also referred to herein as "roaming lease" information.

Although authentication information in the above-described embodiment is entered via an EPG displayed on a television, other embodiments may allow such information to be entered through other devices. For example, the authentication information may be entered in an authentication web page presented via a browser-equipped computer, mobile telephone, PDA, wireless email device, or other Internet protocol (IP) device.

After a successful authentication, the subscriber may be notified regarding the initiation of a roaming session and the expected expiration time of the roaming session. Color, format, style and other aspects of the general "look-and-feel" of the EPG may be altered to reflect the presence of the roaming subscriber. In the example EPG screens shown in FIGS. 4 and 14, look-and-feel options are illustratively identified by colors, such as blue and green, although numerous other options could be provided. This look-and-feel of the EPG may also be referred to herein as the "skin" of the EPG. Additionally, one or more icons or other selection mechanisms may be incorporated into the EPG in order to allow the roaming subscriber to access and modify his or her preferences regarding roaming session, such as changing the list of home location channels which are part of the roaming profile, voluntarily extending or terminating the lease of the roaming session, etc.

When a given roaming session is initiated, the system may send a message back to the home location with the relevant information regarding the session, such as the initiation time, expected duration, and initiation location of the roaming session. Such a message may be passed from the remote head end to the home head end for presentation via an EPG controlled by the interface device at the home location. This presentation of roaming session information at the home location advantageously deters the theft of roaming services.

In presenting such information at the home location, any video currently being viewed on a television at that location may first be resized, e.g., to one-half or one-quarter screen size, so as to facilitate presentation of the roaming session information. Further, an indication of the initiation of a roaming session may be displayed continuously in a prominent location on the EPG. Any of a number of mechanisms involving display of icons, logos, images or other indicators can be used for this purpose.

Alternatively, other messaging formats, such as email, short message service (SMS) and others, may be used to provide the roaming session information to one or more other devices associated with the home location or otherwise designated by the subscriber. It should be noted that if a subscriber initiates roaming through an IP device, certain information regarding the session, such as the approximate location at which the session is initiated, can be obtained in a straightforward manner by reverse lookup of the IP device.

The home location EPG may also be configured to provide a user at that location with an option to deny a given roaming session. This feature allows the home location user to override a roaming session initiated at the remote location, thereby providing enhanced control to prevent theft of roaming services. An option of this type may be provided, for example, at any time after initiation of the roaming session, or even prior to initiation, in conjunction with authentication of the roaming subscriber. If the home location user activates the deny roaming option, the system may automatically disable the roaming session at the remote location, or prevent its initiation if not already initiated, and may not allow any further roaming session at the particular roaming location for a specified period of time, e.g., an hour, a day, etc. as specified in the operator policy database. If there is no user present at the home location then by default roaming may remain enabled at the remote location.

The remote location EPG may be configured to prompt the roaming subscriber with an automatically-generated warning message, e.g., "Renew Roaming Lease," at a specified time prior to the time at which a roaming session is scheduled to end. Such a message may be a single message delivered at a fixed time prior to the scheduled end time, e.g., 15 minutes prior to the scheduled end time. Alternatively, multiple such prompts may be provided, with a decreasing inter-prompt interval as the scheduled end time approaches. This renew roaming lease feature allows the roaming subscriber to extend the lease of the roaming session and thereby continue to have access to the roaming channels at the remote location. If the subscriber selects this renew lease option, he or she may be prompted to re-enter the PIN or other access code typically required for authentication, and to specify a particular duration for the renewed roaming lease. The subscriber may choose to ignore the message, thereby allowing the roaming session to end at the previously-scheduled time.

When a given roaming session ends, the EPG at the remote location returns to its typical configuration. Thus, it reverts back from the particular configuration that it took on during the roaming session, that roaming configuration having been based on the roaming profile and other preferences of the roaming subscriber. Roaming channels which were available during the session, if not otherwise part of the usual available channels at the remote location, will no longer be available at the remote location. Also, the EPG at the home location reverts to its typical configuration, with features such as the above-described deny roaming option being removed from the home location EPG. However, a log of the previous roaming session(s) is still accessible at the home location through the EPG, such that a home location user can check all the roaming sessions that have taken place on his or her account with various other details such as their duration, location, charges incurred, etc.

Illustrative examples of user interfaces as presented on a given television or other presentation device at a home or remote location will now be described in conjunction with FIGS. 3 through 23. It is to be appreciated that the EPGs and other user interfaces shown in these examples are not intended to restrict the scope of the invention in any way. Those skilled in the art will recognize that the underlying techniques can be implemented using a wide variety of alternative user interface configurations.

Certain of the following examples will make reference to two users, denoted "Smith" and "Jones." It is assumed without limitation that Jones is a roaming subscriber, and that Jones initiates a roaming session at a remote location which is the home location of Smith. Of course, it is also possible that Smith could roam to the location of Jones and initiate a roaming session there, and the resulting EPGs and other user interfaces that are provided would be similar to those described in the examples.

Figure 3:
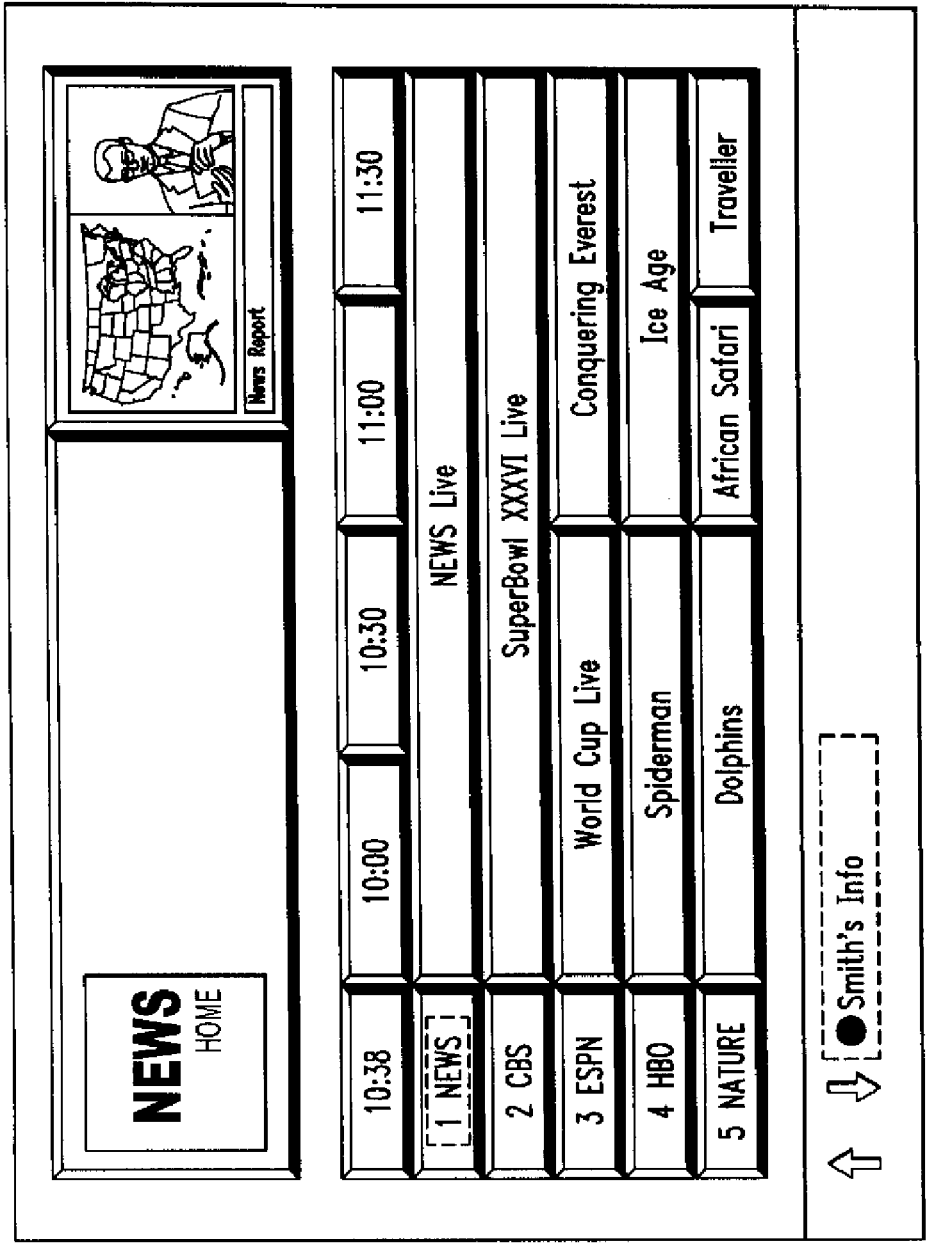

With reference now to FIG. 3, an EPG screen is shown, as generated at remote location 104R on television 110R under the control of interface device 112R. As noted previously, this remote location is the home location of Smith. The screen as shown comprises an EPG in a typical configuration for the remote location, in the absence of any roaming session. The dashed box at the bottom of the screen denotes an icon that when activated provides access to information associated with the account of the remote location user, that is, the Smith account. Such icons can be accessed and activated in a well-known conventional manner, for example, by using keys on a remote control device at the remote location. Activatable icons should be viewed as illustrative examples of what are more generally referred to herein as activatable controls, and such controls can use any of a variety of well-known mechanisms for their presentation, access and activation, including remote control devices as noted above, a computer mouse or other point-and-click device, a stylus, etc.

Also displayed with the EPG in FIG. 3, and similarly in other figures herein, is a reduced-size version of the video output of the current channel, that is, the channel presently selected for viewing at the corresponding location. In this particular figure, the current channel is Channel 1, a news channel. The video output of the current channel is displayed along with an associated channel logo or other channel identifying information. Of course, in other embodiments such information need not be presented, and the EPG may occupy substantially the entire available space of the screen. Also, numerous alternative configurations and arrangements of the various EPG elements are possible.

It should be noted that the video shown in the various screens presented in the figures will typically change as a function of time, channel selection and other factors. Accordingly, the particular images that are shown are merely examples, and not intended to represent any particular configuration.

Figure 4:
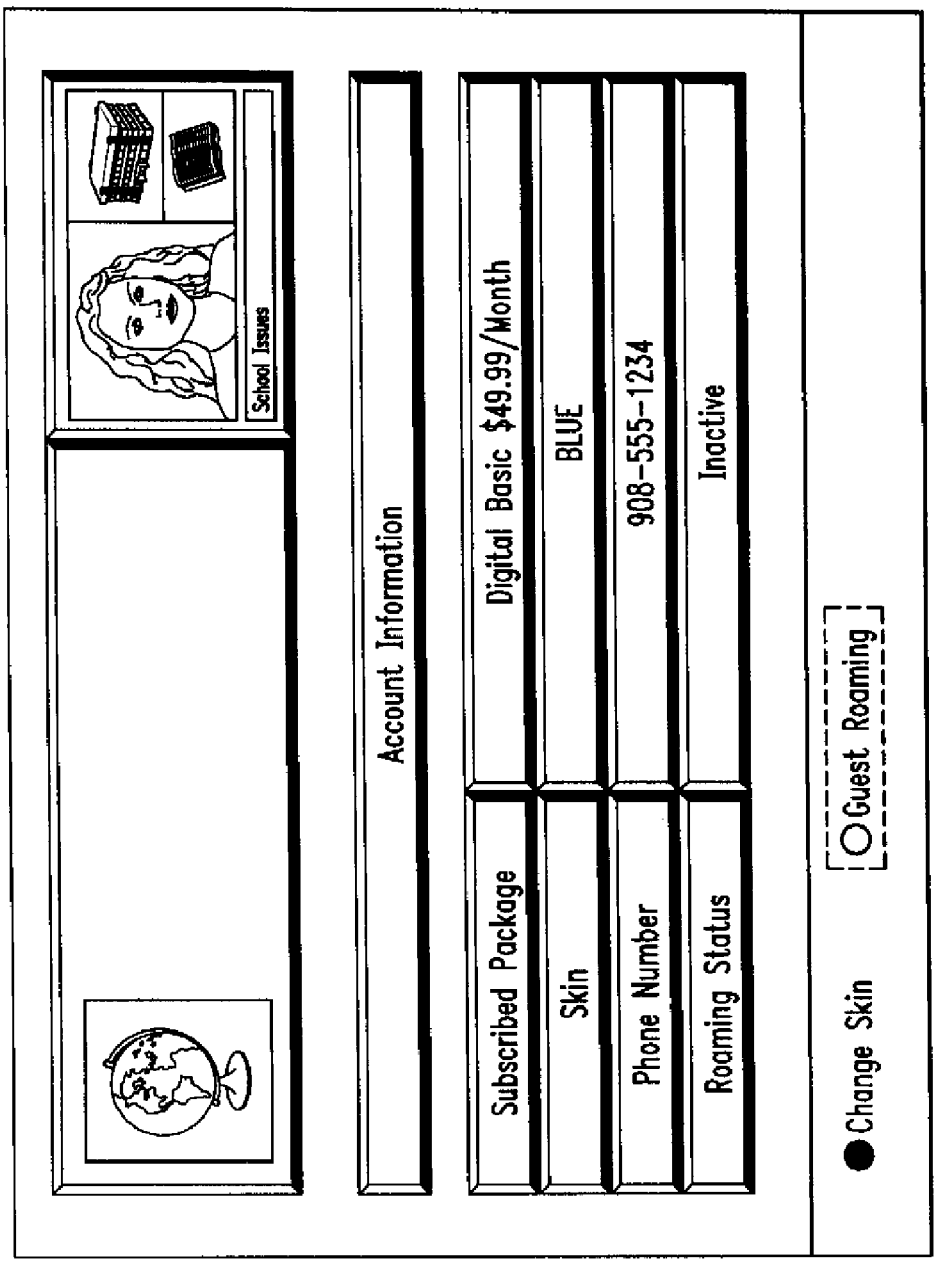

Activation of the icon in the dashed box at the bottom of the screen in FIG. 3 brings up the basic account information screen shown in FIG. 4. This screen presents basic account information for the Smith account, such as subscribed package, EPG look-and-feel or "skin," telephone number, and roaming status. The telephone number is used as an account number in this embodiment, that is, the account of Smith is identified by the telephone number (908) 555-1234. In this screen, a number of additional activatable icons are provided, including a Change Skin icon and a Guest Roaming icon. Activation of the Guest Roaming icon in the dashed box of FIG. 4 brings up the Guest TV Roaming Screen shown in FIG. 5. The roaming user Jones, who is assumed to be present at the remote location, that is, the home location of Smith, enters his authentication information into this screen using, for example, a remote control associated with the remote location. The entered authentication information includes a telephone number and a PIN. As noted previously, the telephone number is used as an account number, and this number for Jones is (516) 555-4321. Jones enters this number, his PIN, and a specified roaming lease duration (e.g., 17 minutes), and then activates the Enable icon shown in the dashed box.

Figure 5:
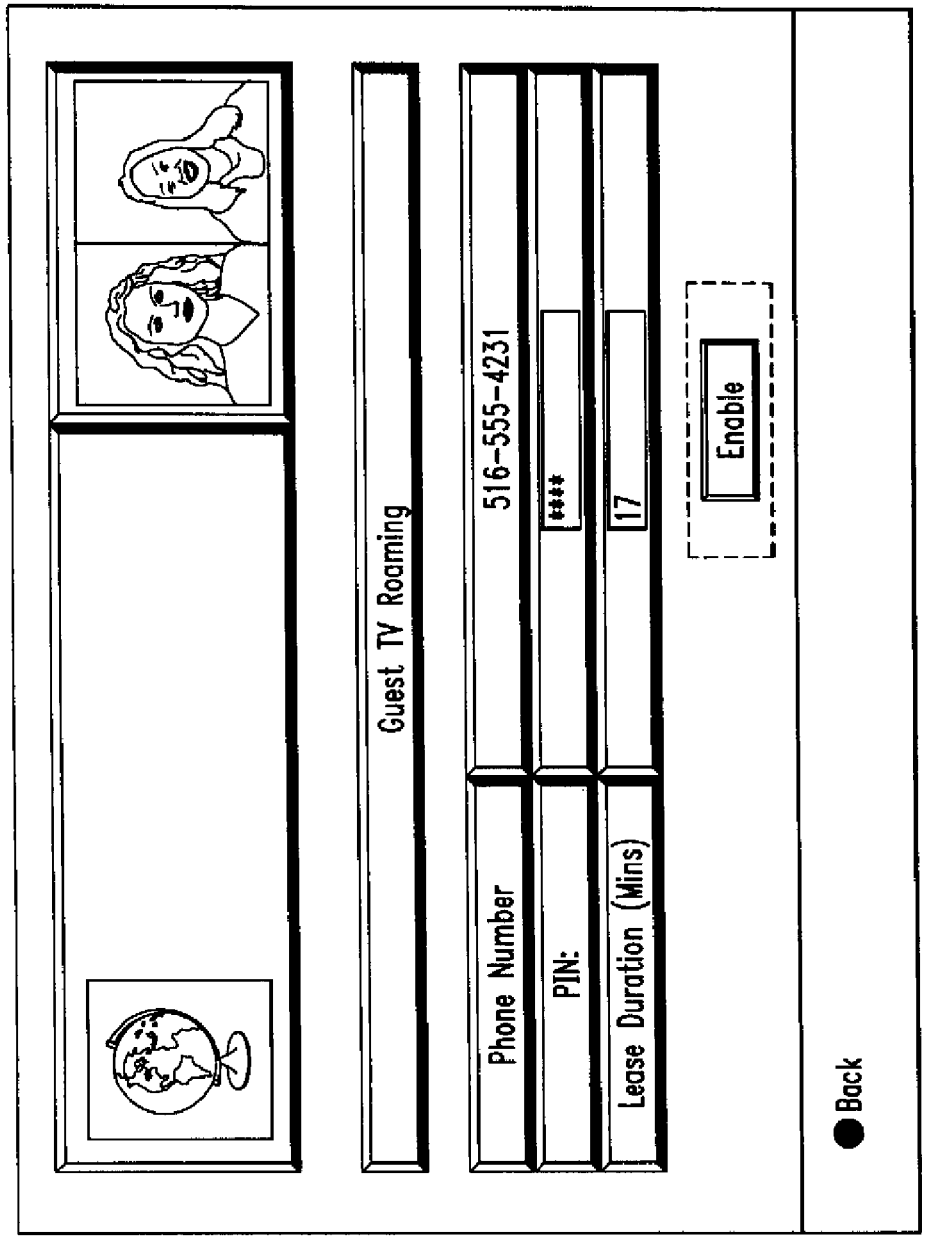
Figure 6:
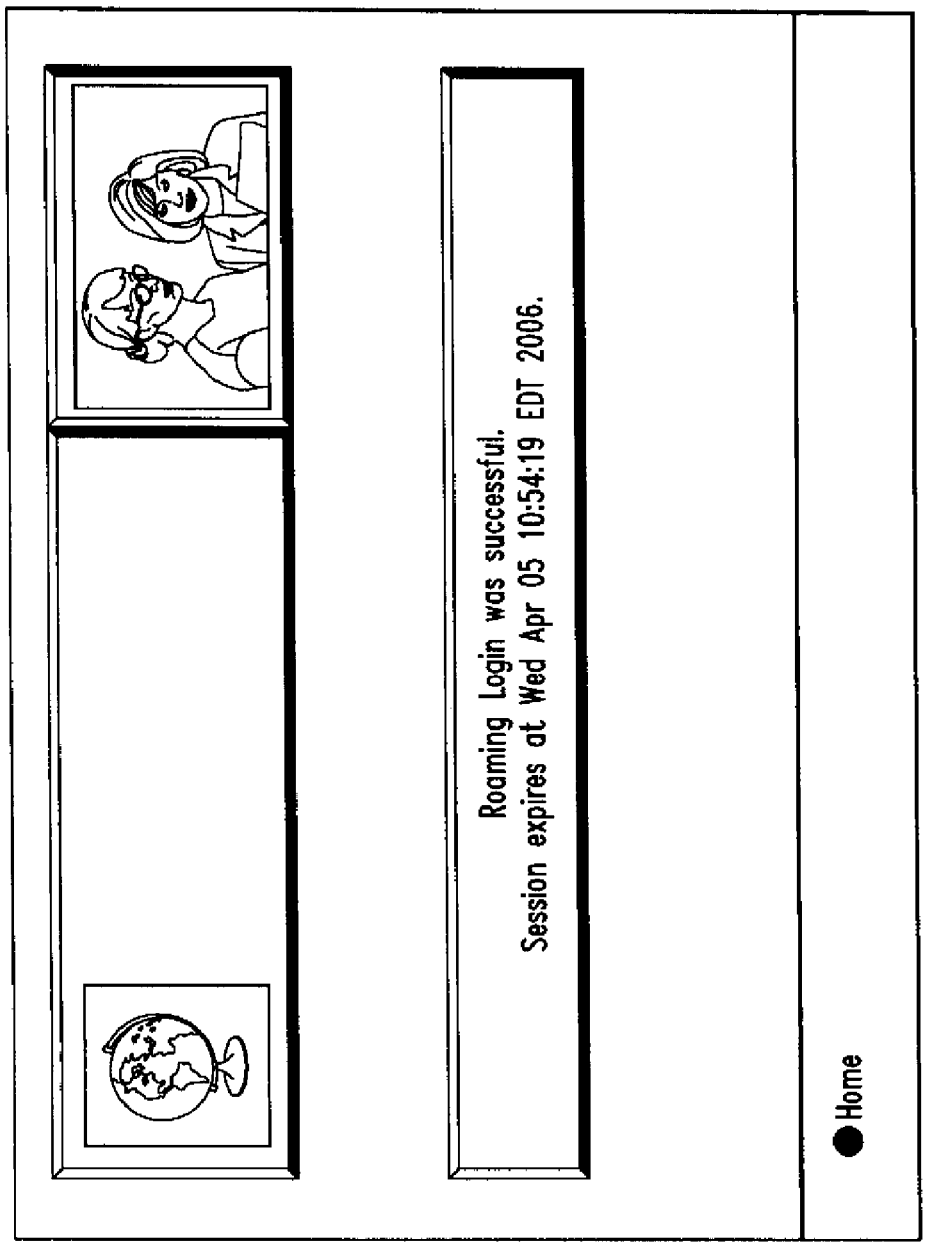
Figure 7:
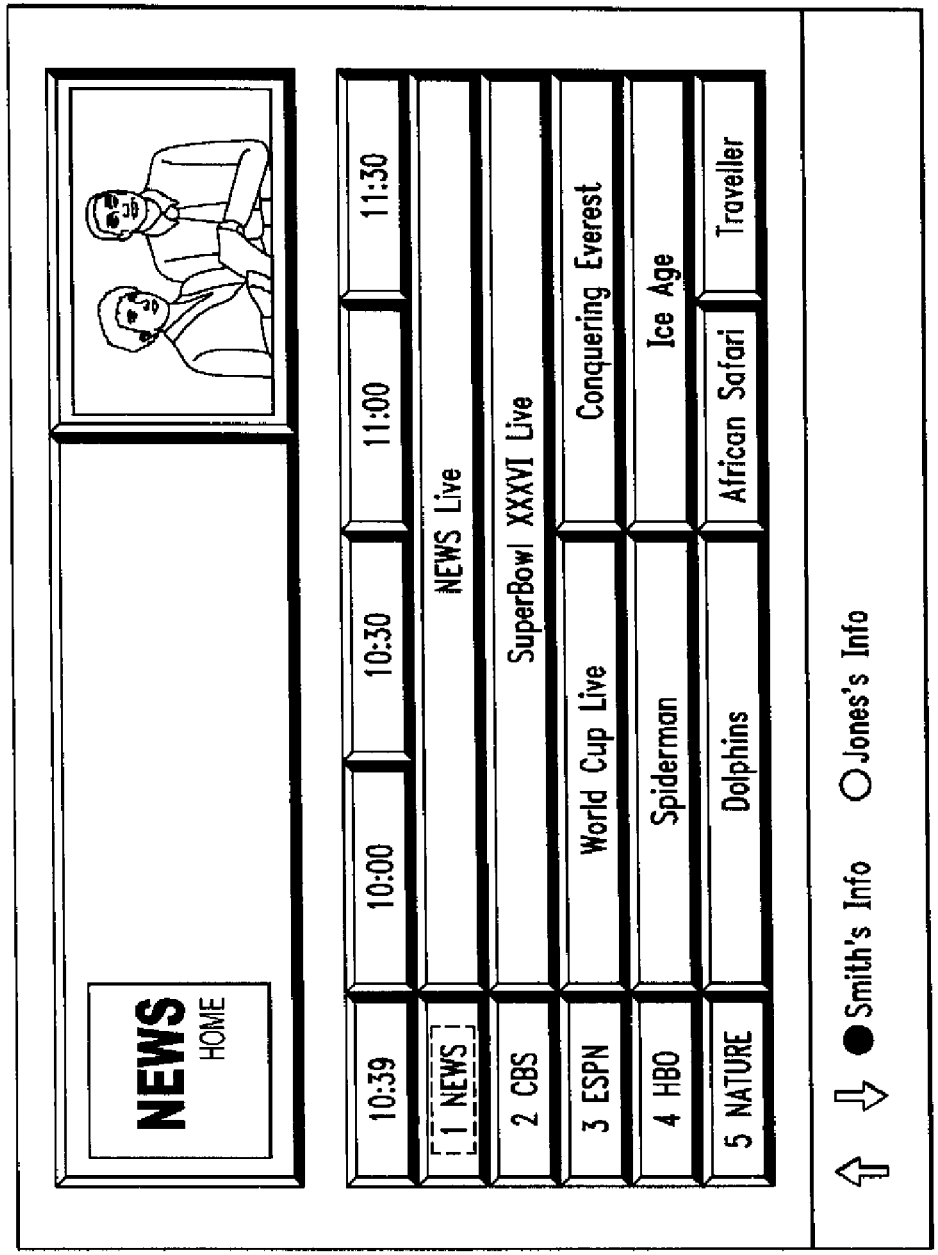

If the roaming login process initiated upon activation of the Enable icon in FIG. 5 is successful, the notification screen shown in FIG. 6 is presented. This screen notifies roaming user Jones that his roaming login was successful, and indicates an expiration date and time for the session in conformance with the specified roaming lease duration. After this screen is presented for a short period of time, an updated version of the EPG is presented as shown in FIG. 7. This updated version of the EPG reflects the presence of the roaming user Jones. It is an example of what is more generally referred to herein as an at least partial alteration of the normal user interface that would otherwise be presented at the remote location absent the roaming session. Such alterations in other embodiments may involve numerous other types of partial replacement or other alteration of particular elements of the normal user interface, complete replacement of the normal user interface, etc.

In the present example, an activatable icon is presented at the bottom of the screen providing access to account information for the roaming user Jones. Also, any channels which were indicated as not available to user Smith in the EPG as shown in FIG. 3 but are part of the roaming profile of user Jones may now be indicated as available. This may be accomplished through appropriate change in color, format or other presentation detail associated with the corresponding channel identifier(s) on the EPG.

Figure 8:
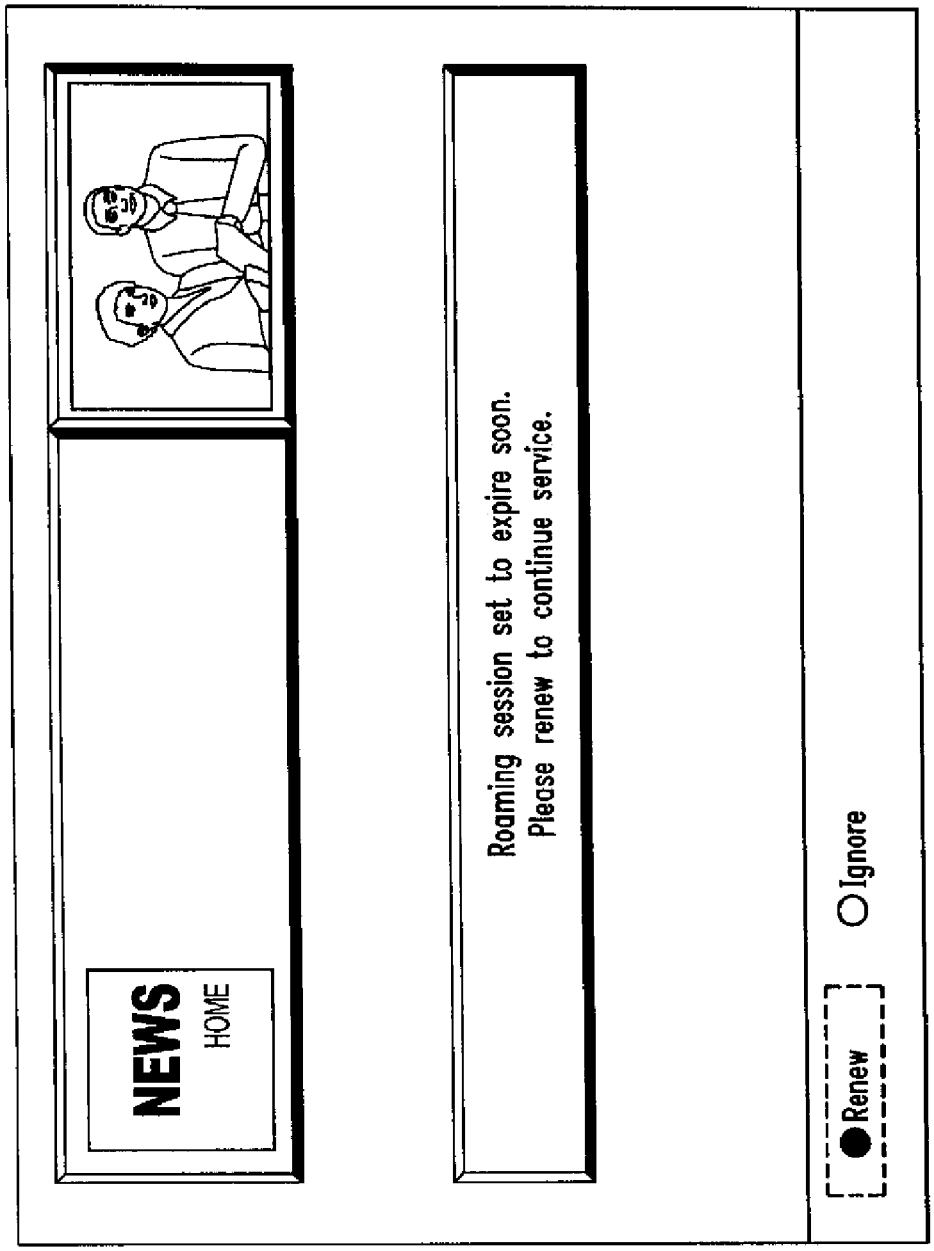
Figure 9:
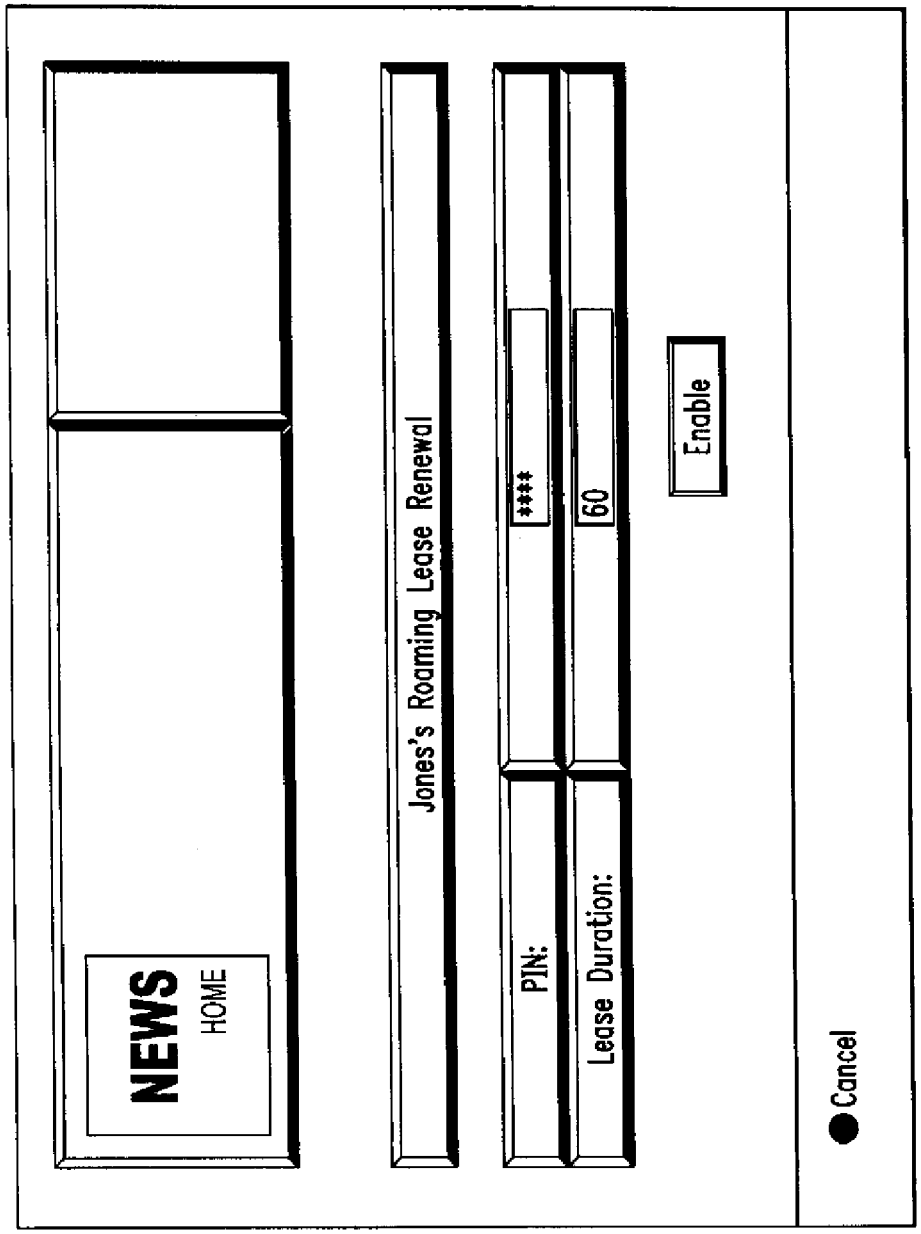
Figure 10:
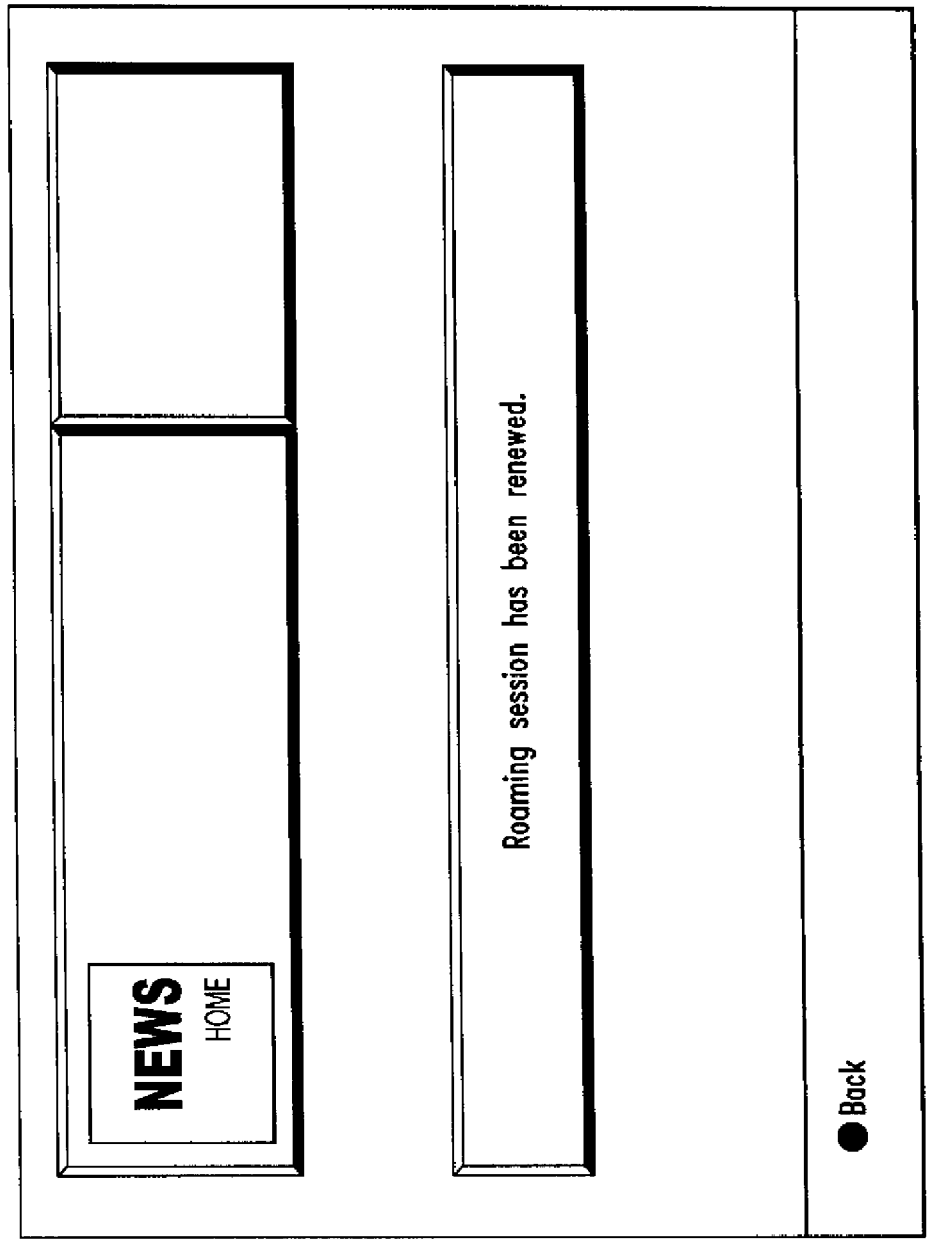

As indicated previously, a roaming user may be provided with an automatic warning message indicating that a given roaming session is about to expire. An example of a user interface screen providing such a message is shown in FIG. 8. The displayed message indicates that the roaming session is set to expire soon, and that the roaming user must renew in order to continue the roaming service at that location. The screen includes activatable icons for Renew and Ignore. Activation of the Renew icon shown in the dashed box in FIG. 8 results in presentation of the renewal screen shown in FIG. 9. This screen allows Jones to re-enter his PIN and specify a new roaming lease duration. Activation of the Enable icon results in presentation of a roaming session renewal message as shown in FIG. 10.

Figure 11:
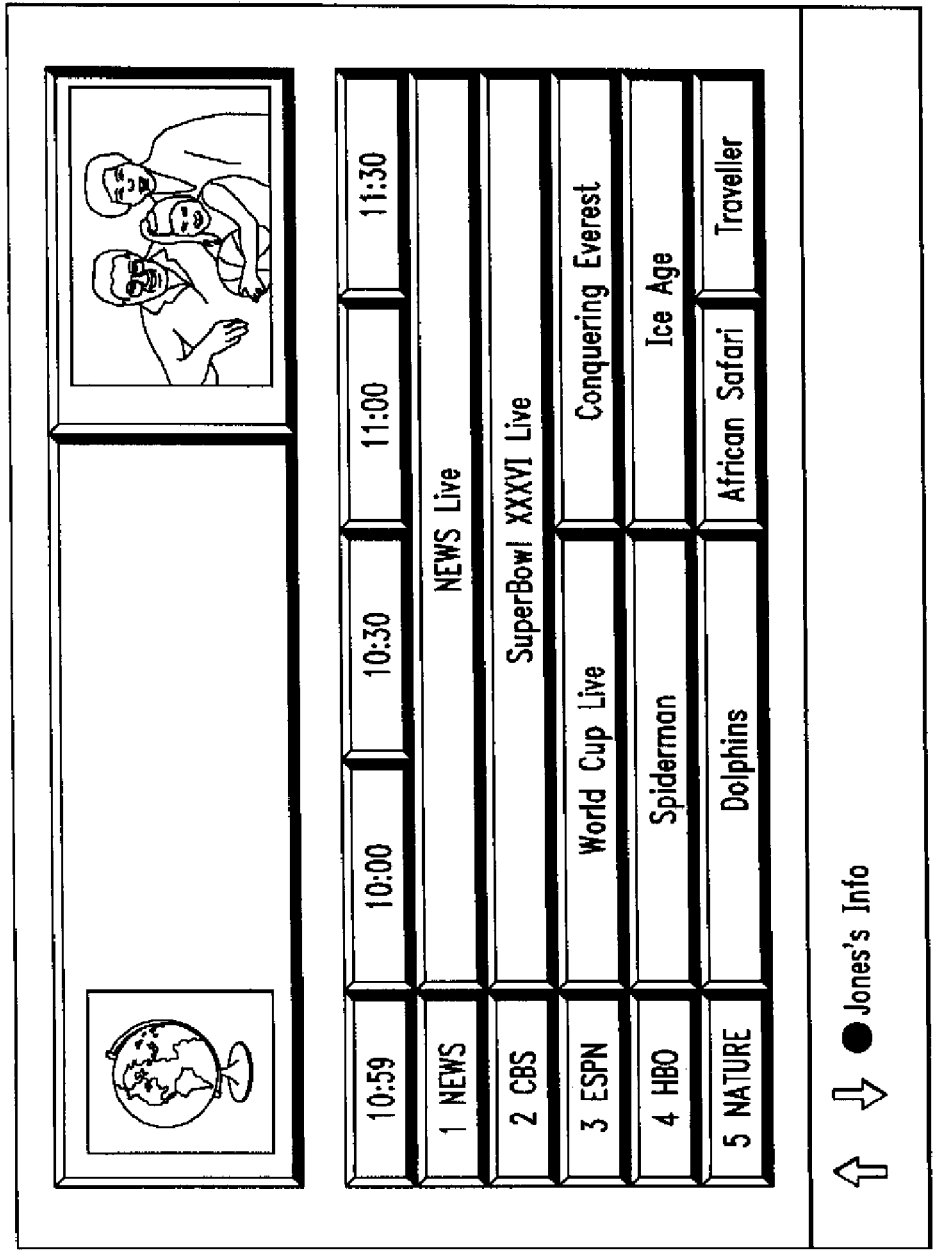

FIG. 11 shows the EPG at the home location of Jones. This screen is similar to the remote location EPG of Smith, but includes an activatable icon for accessing the account information of Jones. In the present example, it is generated at home location 104H on television 110H under the control of interface device 112H.

Figure 12:
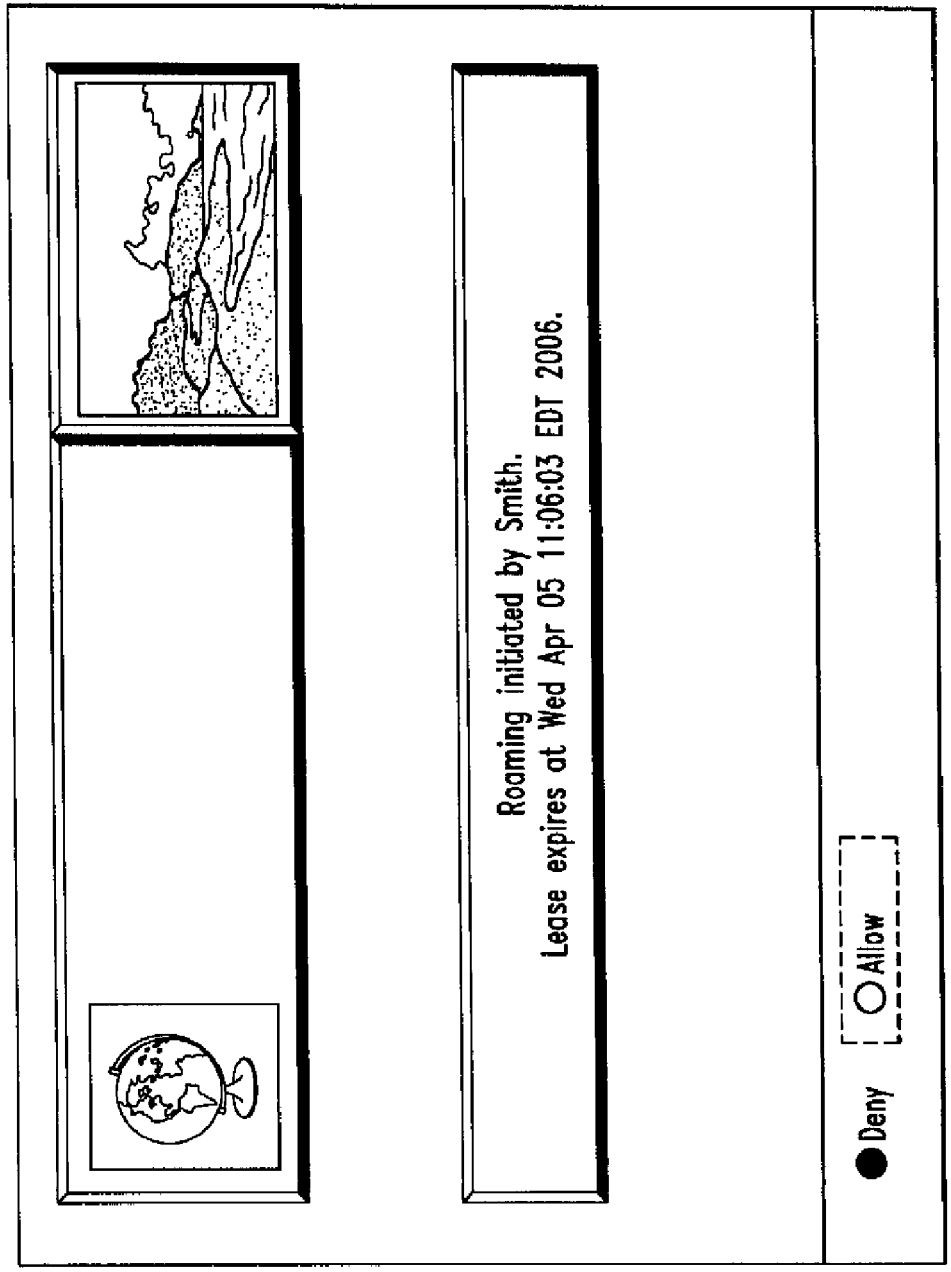

After roaming is initiated at the Smith remote location in the manner described in conjunction with FIGS. 5 and 6, a message is displayed on the screen at the home location of Jones, as shown in FIG. 12. The message indicates that a roaming session was initiated at the Smith location, and also indicates the expiration date and time of the roaming session. The screen also includes activatable icons for Deny and Allow. Thus, a user at the home location of Jones can deny or allow the roaming session initiated at the Smith location. As indicated previously, such an arrangement helps to prevent theft of roaming services. Activation of the Deny icon will cause the roaming session to be terminated. If neither of the icons is activated for a certain period of time, the displayed message may be removed by default under the assumption that failure to activate either icon indicates that the initiated roaming session is not objectionable to the user at the Jones home location.

Figure 13:
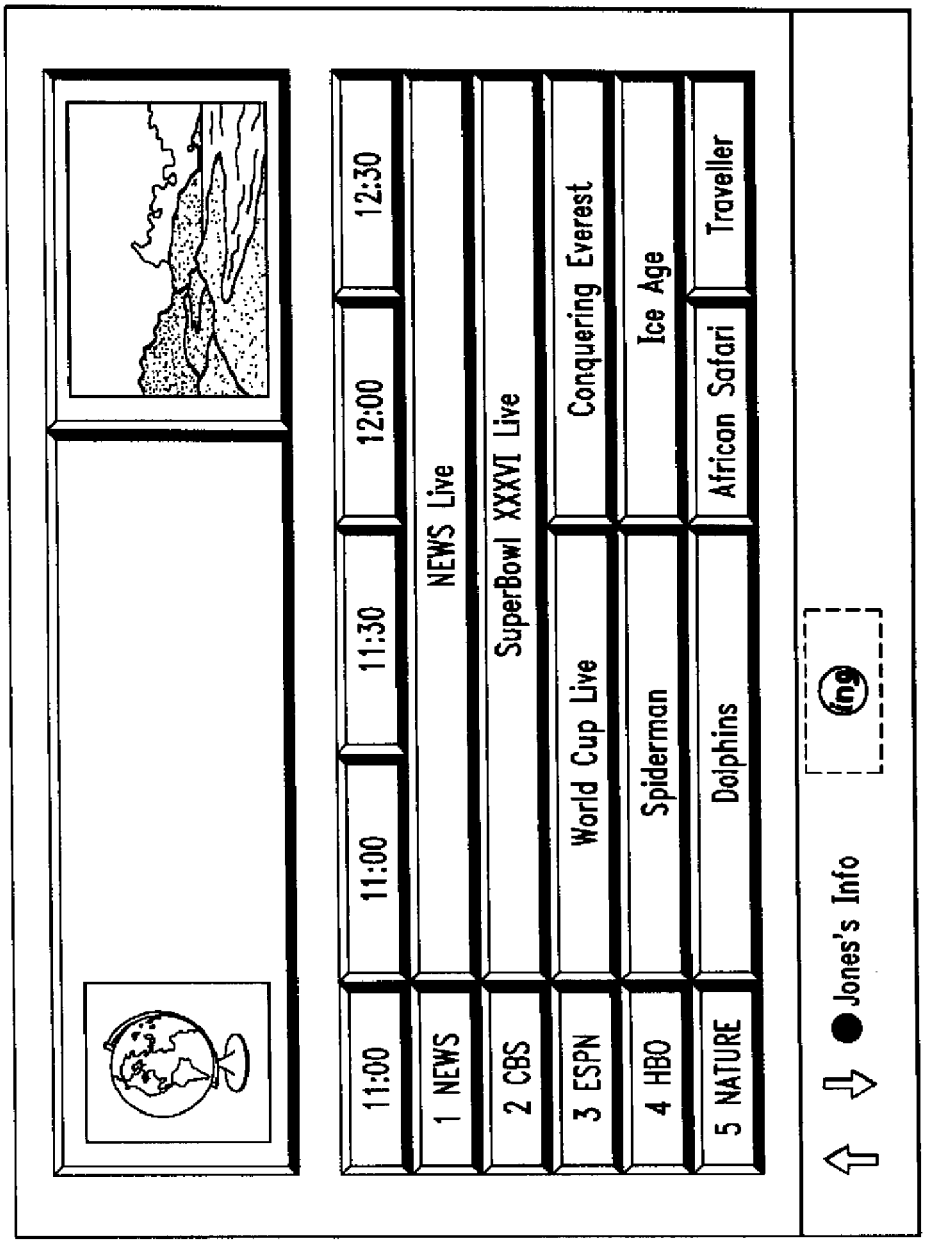

If the Allow icon is activated in the screen of FIG. 12, or if the notification message is otherwise removed by default as previously described, the normal home location screen of Jones is presented as shown in FIG. 13. This home location screen is generally the same as that described in conjunction with FIG. 11, but further includes an activatable Roaming icon as shown in the dashed box. The Roaming icon in this example is an animated graphic interchange format (GIF) icon in which the word "Roaming" scrolls from left to right. It is placed on the screen to notify a user at the Jones home location that roaming has been initiated on the Jones account at a remote location, namely, the Smith home location. The Roaming icon ensures that the user at the Jones home location will be alerted as to the presence of a roaming session even if the user misses the initial notification message of FIG. 12. The Roaming icon will remain on the EPG screen for the duration of the roaming session. Of course, numerous other types of icons, logos or other indicators may be used in other embodiments.

Figure 14:
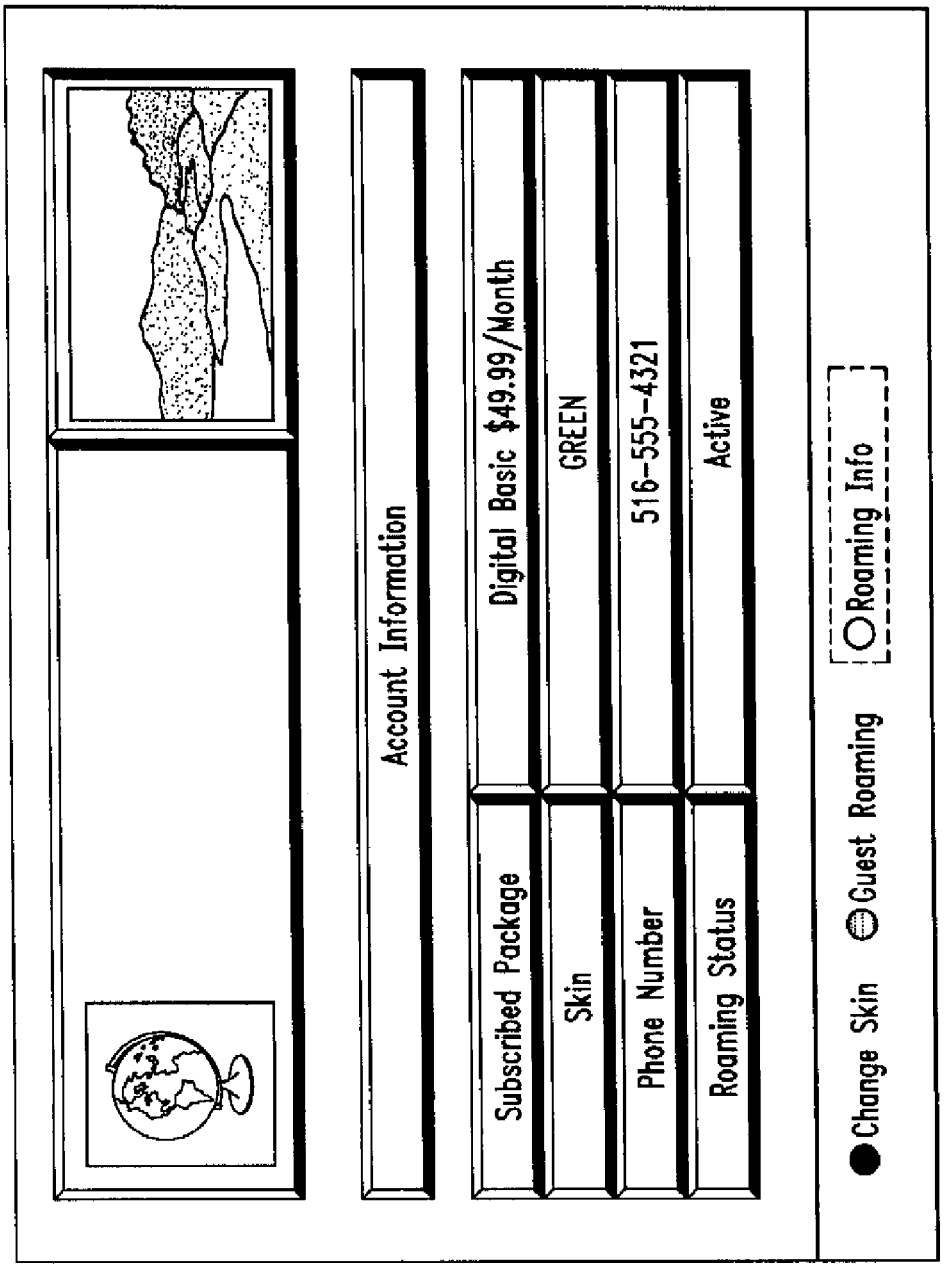

Activation of the Roaming icon in the dashed box of FIG. 13 results in presentation of the basic account information screen of FIG. 14. This screen indicates that the Jones account has an active roaming status, meaning that there is at least one active roaming session established for the account. The account information further includes the subscribed package, the selected look-and-feel or "skin," and the telephone number which serves as an account number in the present example. Like the Smith account information screen of FIG. 4, the Jones account information screen as shown in FIG. 14 includes Change Skin and Guest Roaming activatable icons. Since the roaming status is active, the screen further includes a Roaming Info icon as shown in the dashed box. Activating this Roaming Info icon leads to the screen of FIG. 15, which presents additional information regarding the active roaming session, such as the roaming location, which in this example is the Smith home location, the start time of the roaming session, and the scheduled end time of the roaming session. The screen further includes activatable icons for Deny Roaming and Back functions.

Figure 15:
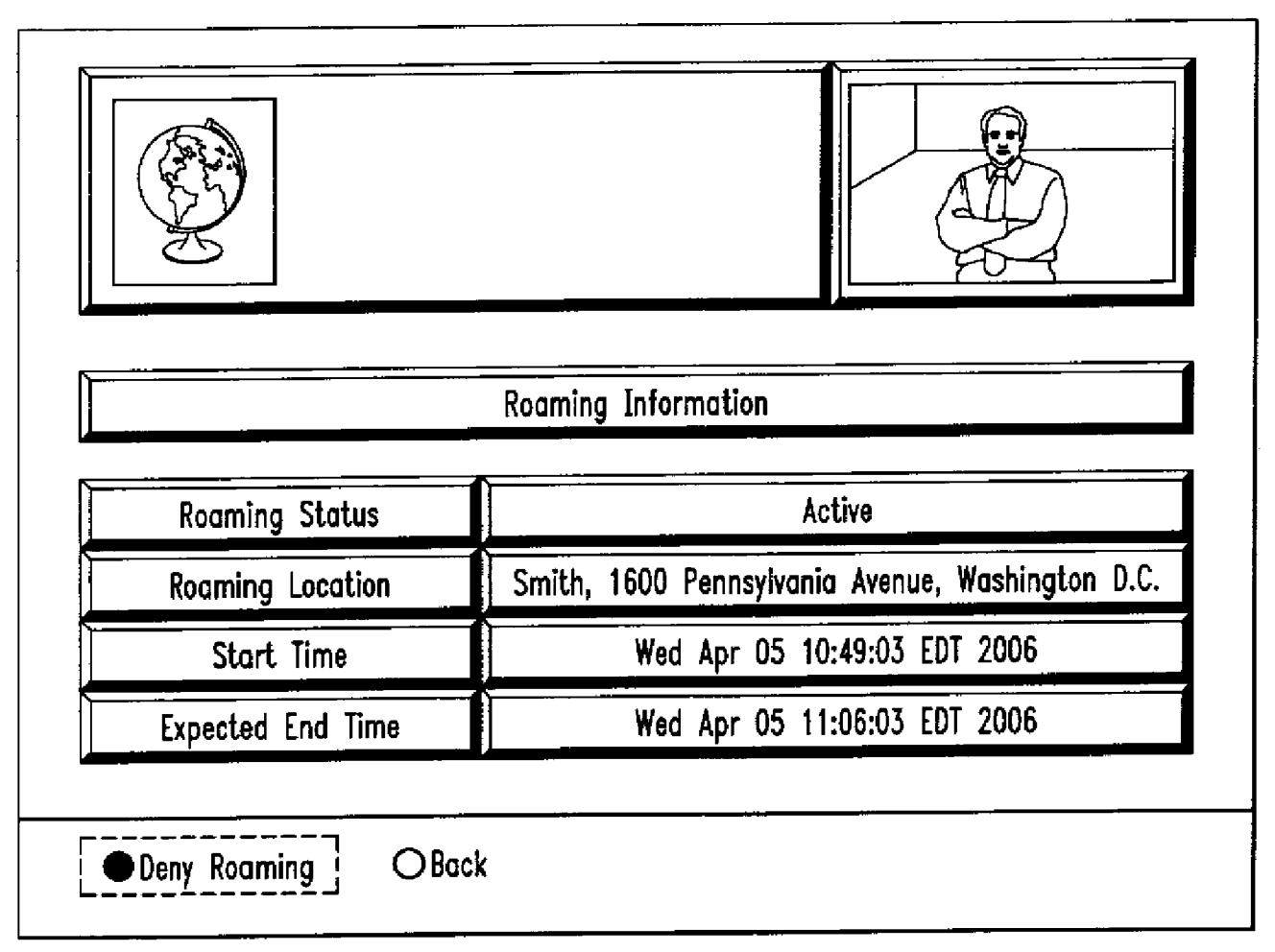
Figure 16:
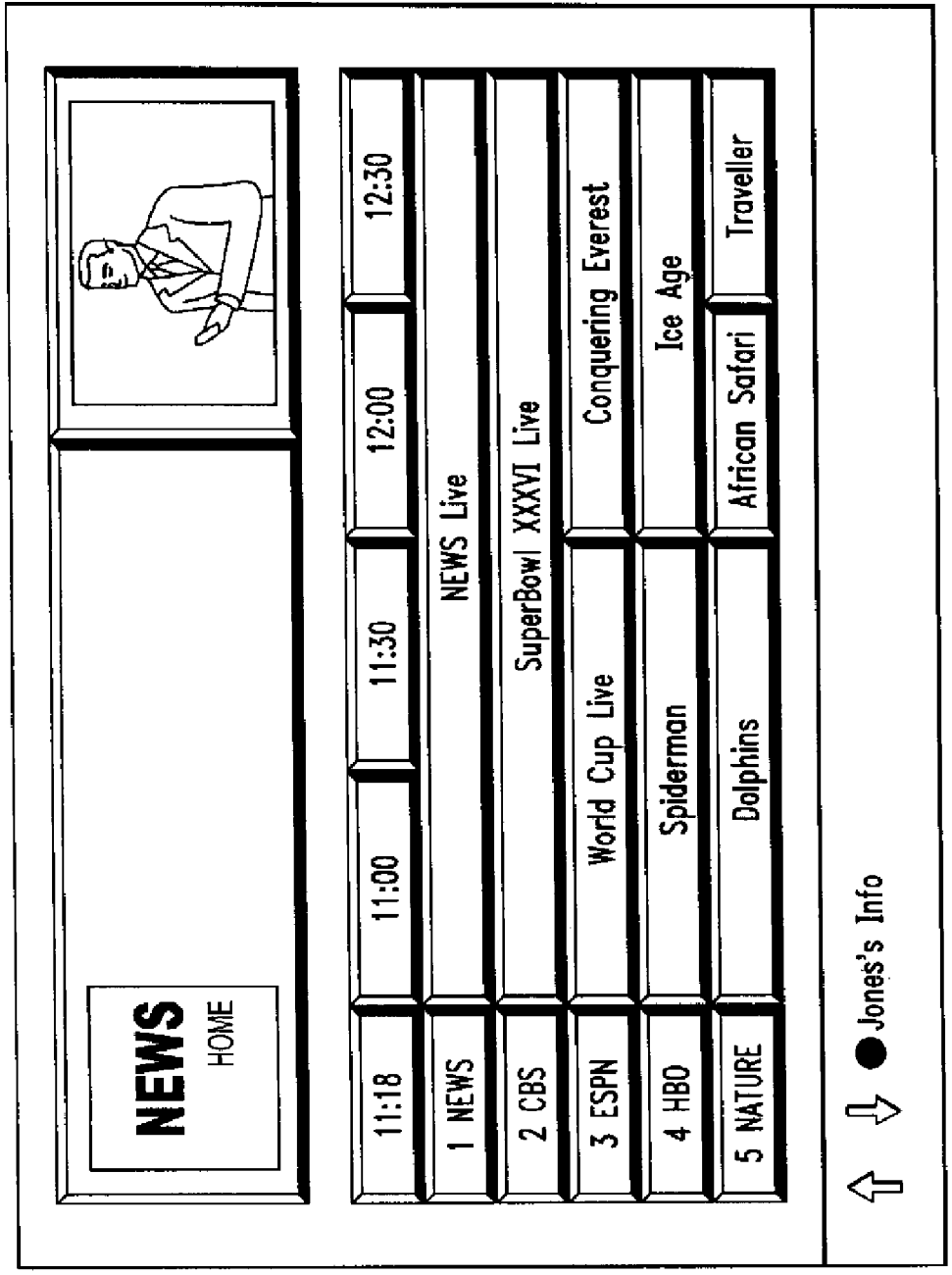
Figure 17:
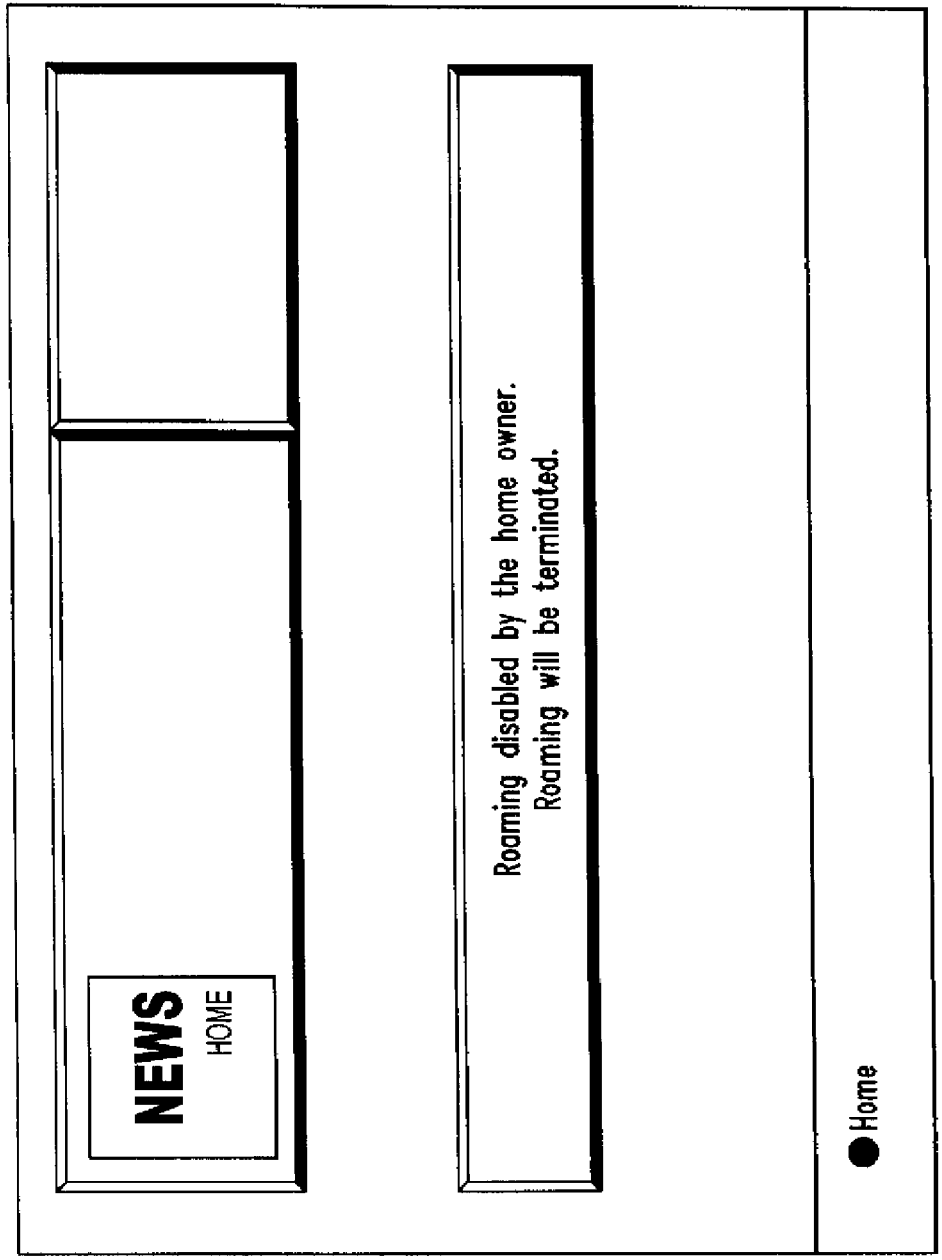

If the user at the Jones home location activates the Deny Roaming icon shown in the dashed box in FIG. 15, the roaming session is terminated and the Jones home location EPG reverts to its normal configuration as shown in FIG. 16, with no Roaming indicator. This screen has basically the same configuration as the FIG. 11 screen. At the remote location where the roaming session was initiated, a message is displayed as shown in FIG. 17 indicating that the roaming has been disabled from the home location, and will be terminated.

Figure 18:
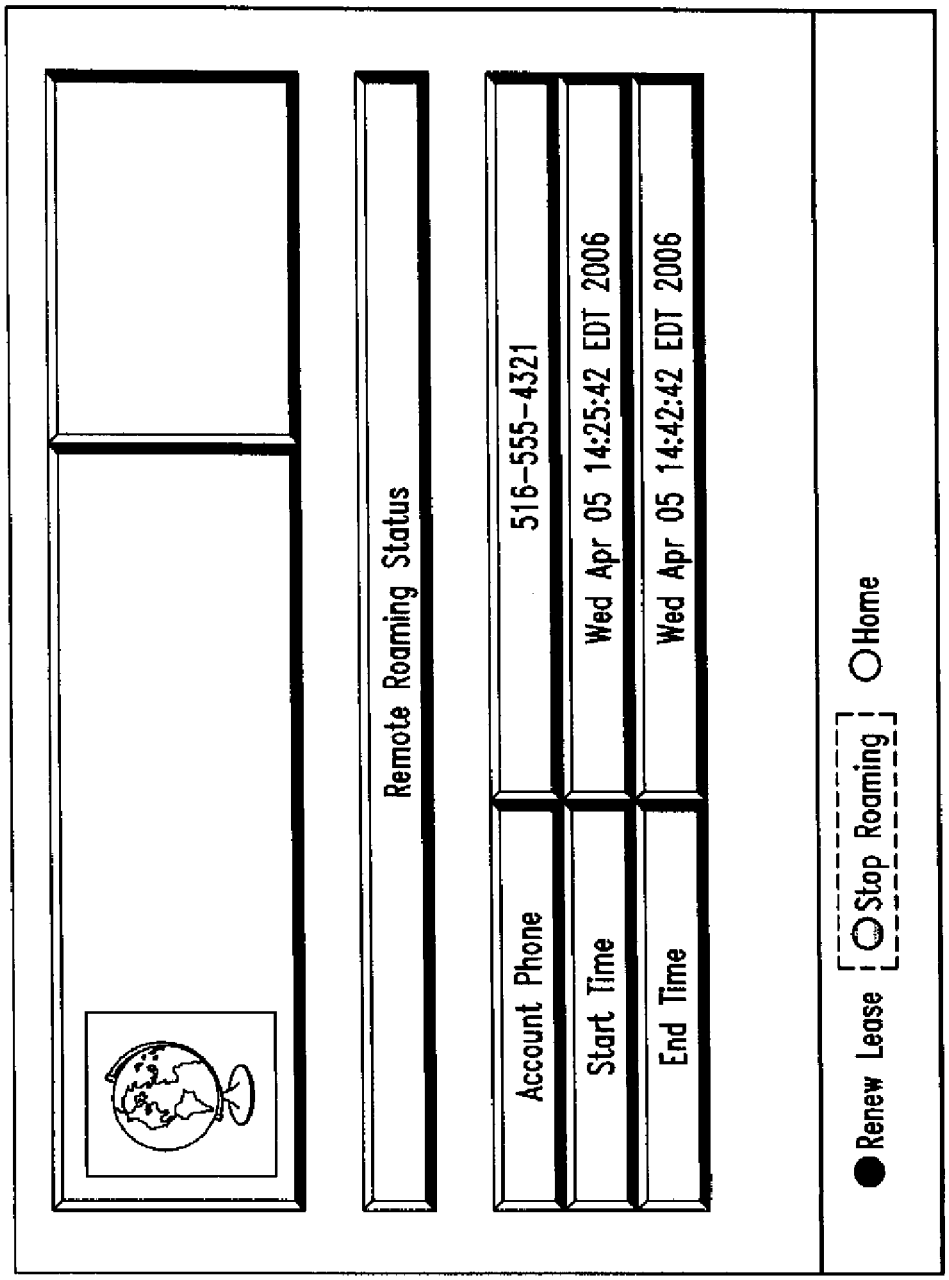
Figure 19:
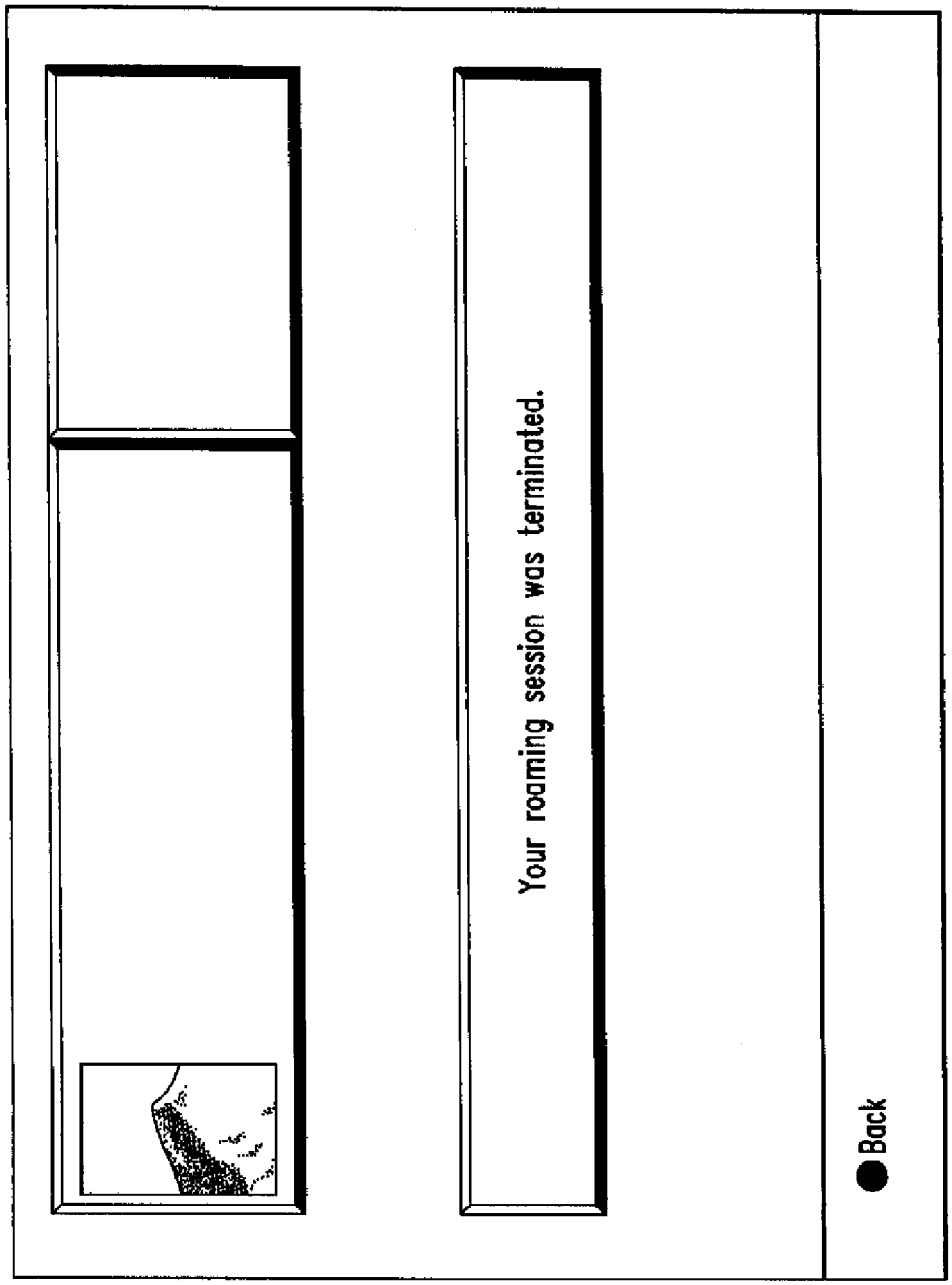

FIG. 18 shows a remote roaming status screen that may be presented to the roaming user Jones at the Smith home location. This screen indicates the account telephone number, and the start and end times of the current roaming session. It includes activatable icons for Renew Lease, Stop Roaming and Home. Activation of the Stop Roaming icon in the dashed box will result in presentation of the screen shown in FIG. 19, which includes a message indicating that the roaming session has been terminated.

As noted previously, FIG. 20 shows an EPG in an embodiment in which a group of contiguous channels have been allocated for use as roaming channels. These channels are identified as 31Roam, 32Roam, 33Roam, and so on. This EPG is presented at the Smith home location, which as noted above is the remote location of the roaming user Jones. It is assumed that no roaming session has yet been initiated, and so there are no channel names from the Jones channel profile assigned to the various dedicated roaming channels at the Smith location.

FIGS. 21 and 22 show consecutive portions of the Smith location EPG after Jones has initiated his roaming session. Assuming that the group of contiguous roaming channels includes ten channels denoted 31Roam through 40Roam, and the Jones roaming profile includes seven channels, the various channels of the Jones roaming profile are assigned to the first seven of the ten available channel positions as shown. Thus, channel 31 at the Smith location becomes Food Channel, channel 32 becomes WB, channel 33 becomes UPN, and so on, in accordance with the roaming profile of Jones. Since Jones has only seven roaming channels, and there are ten available channel positions, the last three channel positions, identified as 38Roam, 39Roam and 40Roam, remain unassigned. Activation of a given one of the unassigned channel indicators in the EPG as shown in FIG. 20 or FIG. 22 will result in a system alert message of the type shown in FIG. 23, which specifies that there is no roaming content available for that channel.

The various EPGs and other user interface screens as shown in FIGS. 3 through 23 can be generated in a straightforward manner using otherwise conventional programming techniques that are well understood by those skilled in the art. For example, the screens can be generated using one or more software programs that are executed using processor and memory elements associated with the home and remote locations. Other system elements, such as head end equipment, may also be utilized in the generation of these screens. Again, it is to be appreciated that the particular screens shown are presented by way of example only, and may be replaced with numerous other types and arrangements of user interfaces appropriate for carrying out the described functionality.

The above-described embodiments of the invention are intended to be illustrative only. For example, although described in the context of particular signal distribution systems, the invention is not restricted to use in such systems. The described roaming television services techniques can be adapted in a straightforward manner to a wide variety of alternative systems, including cable and satellite television systems, using different arrangements of system elements. As indicated above, the techniques can be applied to a wide variety of subscription media services, including subscription audio services delivered via digital satellite radio, and to other arrangements for delivering signals associated with subscription media services.

Further, the media streams that are delivered to a remote location on behalf of a given subscriber may include any type of data, including, for example, digital audio, video, speech or other information signals, in any combination.

These and numerous other alternative embodiments within the scope of the following claims will be readily apparent to those skilled in the art.

We claim:

1. A method of providing access to a subscription service in a signal distribution system to a system user at a location remote from a home location of the user, the subscription service comprising a plurality of selectable channels available to the user at the home location, the method comprising the steps of:

receiving a request for initiation of a roaming session; and
generating responsive to initiation of the roaming session at least one user interface for presentation on a device at the remote location, wherein the generated user interface is configured to provide access at the remote location to one or more of the channels available to the user at the home location and represents an at least partial alteration of a normal user interface that is presented on the device at the remote location prior to initiation of the roaming session;
wherein the normal user interface presented on the device at the remote location prior to initiation of the roaming session comprises an identifier of at least one predetermined generic roaming channel which is allocated for presentation of roaming content even if no such roaming content is available, and the generated user interface replaces said identifier with an identifier of one of the channels available to the user at the home location.

2. The method of claim 1 wherein the normal user interface comprises a plurality of identifiers of predetermined contiguous generic roaming channels which are allocated for presentation of roaming content even if no such roaming content is available, and the generated user interface replaces said identifiers with respective identifiers of at least a subset of the plurality of the channels available to the user at the home location.

3. A method of providing access to a subscription service in a signal distribution system to a system user at a location remote from a home location of the user, the subscription service comprising a plurality of selectable channels available to the user at the home location, the method comprising the steps of:

receiving a request for initiation of a roaming session; and
generating responsive to initiation of the roaming session at least one user interface for presentation on a device at the remote location, wherein the generated user interface is configured to provide access at the remote location to one or more of the channels available to the user at the home location and represents an at least partial alteration of a normal user interface that is presented on the device at the remote location prior to initiation of the roaming session;
wherein the request for initiation of the roaming session is generated responsive to activation of an activatable roaming session initiation control that is part of the normal user interface presented on the device at the remote location; and
wherein responsive to initiation of the roaming session a normal user interface that is presented on a device at the home location prior to initiation of the roaming session is automatically modified to provide an indication that the roaming session has been initiated;
said at least partial alteration of the normal user interface that is presented on the device at the remote location prior to initiation of the roaming session comprising replacement of at least one predetermined generic roaming channel identifier with an identifier of a selected one of said channels available to the user at the home location.

4. The method of claim 3 wherein the generated user interface comprises at least one screen of an electronic program guide.

5. The method of claim 3 wherein the generated user interface completely replaces the normal user interface that would otherwise be presented on the device at the remote location in the absence of the roaming session.

6. The method of claim 3 wherein the normal user interface indicates that a given one of the channels available to the user at the home location is unavailable at the remote location, and the generated user interface indicates that the given channel is available at the remote location in conjunction with the roaming session.

7. The method of claim 3 wherein the roaming session is initiated by the user entering authentication information via a screen of the normal user interface.

8. The method of claim 3 wherein in conjunction with initiation of the roaming session the user is permitted to specify a duration for the roaming session.

9. The method of claim 3 wherein the generated user interface alters the normal user interface by presenting at least one activatable control associated with the user.

10. The method of claim 3 wherein the generated user interface provides a warning message prior to expiration of the roaming session.

11. The method of claim 3 wherein the generated user interface comprises an activatable control that allows the roaming session to be renewed prior to its expiration.

12. The method of claim 3 further including the step of generating at least one additional user interface for presentation on the device at the home location wherein the additional home location user interface includes information regarding the roaming session.

13. The method of claim 3 wherein the home location user interface further comprises an activatable control which if activated will terminate the roaming session.

14. The method of claim 3 wherein the home location user interface comprises an activatable control which if activated provides information identifying at least the status of the roaming session and an indication as to the corresponding remote location.

15. An interface device comprising a processor coupled to a memory and being configured for use in providing access to a subscription service in a signal distribution system to a system user at a location remote from a home location of the user, the subscription service comprising a plurality of selectable channels available to the user at the home location, the interface device being operative to generate, responsive to initiation of a roaming session, at least one user interface for presentation at the remote location, wherein the generated user interface is configured to provide access at the remote location to one or more of the channels available to the user at the home location and represents an at least partial alteration of a normal user interface that is presented at the remote location prior to initiation of the roaming session, wherein the request for initiation of the roaming session is generated responsive to activation of an activatable roaming session initiation control that is part of the normal user interface presented at the remote location, and wherein responsive to initiation of the roaming session a normal user interface that is presented at the home location prior to initiation of the roaming session is automatically modified to provide an indication that the roaming session has been initiated, said at least partial alteration of the normal user interface that is presented on the device at the remote location prior to initiation of the roaming session comprising replacement of at least one predetermined generic roaming channel identifier with an identifier of a selected one of said channels available to the user at the home location.

16. The interface device of claim 15 wherein said interface device comprises a set-top box.

17. The interface device of claim 15 wherein said interface device is connectable to a separate presentation device configured to present the remote location user interfaces.

18. The interface device of claim 15 wherein said interface device comprises a presentation device configured to present the remote location user interfaces.

19. An apparatus for use in providing access to a subscription service in a signal distribution system to a system user at a location remote from a home location of the user, the subscription service comprising a plurality of selectable channels available to the user at the home location, the apparatus comprising:

head end equipment comprising at least one server, the head end equipment being adapted for communication with an interface device at the remote location;

the head end equipment being operative to process a request for initiation of a roaming session;

wherein the interface device responsive to initiation of the roaming session generates at least one user interface for presentation at the remote location, wherein the generated user interface is configured to provide access at the remote location to one or more of the channels available to the user at the home location and represents an at least partial alteration of a normal user interface that is presented on the device at the remote location prior to initiation of the roaming session;

wherein the request for initiation of the roaming session is generated responsive to activation of an activatable roaming session initiation control that is part of the normal user interface presented on the device at the remote location; and wherein responsive to initiation of the roaming session a normal user interface that is presented on a device at the home location prior to initiation of the roaming session is automatically modified to provide an indication that the roaming session has been initiated;

said at least partial alteration of the normal user interface that is presented on the device at the remote location prior to initiation of the roaming session comprising replacement of at least one predetermined generic roaming channel identifier with an identifier of a selected one of said channels available to the user at the home location.

* * * * *